United States Patent
Yoshida et al.

(10) Patent No.: US 7,195,261 B2
(45) Date of Patent: Mar. 27, 2007

(54) POSITION SENSOR SYSTEM AND VEHICLE SEAT PROVIDED WITH THE POSITION SENSOR SYSTEM

(75) Inventors: Masami Yoshida, Tochigi (JP); Shigeru Endo, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 394 days.

(21) Appl. No.: 10/706,818

(22) Filed: Nov. 12, 2003

(65) Prior Publication Data

US 2004/0100388 A1    May 27, 2004

(30) Foreign Application Priority Data

| Nov. 12, 2002 | (JP) | ............................. | 2002-328080 |
| Dec. 13, 2002 | (JP) | ............................. | 2002-361748 |
| Jan. 6, 2003 | (JP) | ............................. | 2003-000684 |
| Jan. 6, 2003 | (JP) | ............................. | 2003-000685 |
| Jan. 6, 2003 | (JP) | ............................. | 2003-000713 |
| Jan. 6, 2003 | (JP) | ............................. | 2003-000716 |
| Jan. 6, 2003 | (JP) | ............................. | 2003-000723 |
| Jan. 6, 2003 | (JP) | ............................. | 2003-000724 |
| Jan. 7, 2003 | (JP) | ............................. | 2003-000863 |

(51) Int. Cl.
  *B60R 21/01*    (2006.01)

(52) U.S. Cl. ................ 280/135; 307/10.1; 324/207.21; 324/207.24

(58) Field of Classification Search ............... 280/735; 307/10.1; 701/45; 324/207.2, 207.21, 207.24
See application file for complete search history.

(56) References Cited

U.S. PATENT DOCUMENTS

| 5,967,549 | A | 10/1999 | Allen et al. |
| 6,053,529 | A | 4/2000 | Frusti et al. |
| 6,351,994 | B1 | 3/2002 | Pinkos et al. |
| 6,561,544 | B1 * | 5/2003 | Clancy et al. .............. 280/735 |
| 6,593,735 | B2 * | 7/2003 | Becker .................. 324/207.26 |

(Continued)

FOREIGN PATENT DOCUMENTS

JP     61150642    9/1986

(Continued)

OTHER PUBLICATIONS

International Search Report dated Jan. 13, 2004(International Application No. PCT/JP03/14391).

*Primary Examiner*—Ruth Ilan
(74) *Attorney, Agent, or Firm*—Dann, Dorfman, Herrell and Skillman, P.C.

(57) ABSTRACT

A position sensor system is provided at a slidable vehicle seat for sensing seat position in zones and facilitating controlling of the operation of a vehicle passenger restraint device according to a position of the vehicle seat relative to the vehicle passenger restraint device. The vehicle seat includes a pair of substantially parallel slide rail mechanisms which comprise upper rail members and lower rail members mounted to a floor of a vehicle, the upper rail members being attached to lower portions of the vehicle seat and supported to the lower rail members so as to be movable along the lower rail members, so that the vehicle seat can be moved along the lower rail members. The upper rail members and the lower rail members are combined with each other, to thereby define inner spaces. The position sensor system is mounted within at least one of the inner spaces.

30 Claims, 21 Drawing Sheets

U.S. PATENT DOCUMENTS 6,612,614 B2 * 9/2003 Wolfe .................... 280/735
6,683,544 B2 * 1/2004 Tokunaga et al. ............ 341/15
6,870,366 B1 * 3/2005 Becker et al. ......... 324/207.26

FOREIGN PATENT DOCUMENTS

| JP | 6343953 | 3/1988 |
| JP | 2002213904 | 3/1988 |
| JP | 200248505 | 2/2002 |
| WO | WO 03/008227 A1 * | 1/2003 |

* cited by examiner

POSITION SENSOR SYSTEM AND VEHICLE SEAT PROVIDED WITH THE POSITION SENSOR SYSTEM

BACKGROUND OF THE INVENTION

1. Field of the Invention

This invention relates to a position sensor system for facilitating controlling of the operation of a vehicle passenger restraint device and a slidable vehicle seat provided with the position sensor system and, more particularly, to a position sensor system for facilitating controlling of the operation of a vehicle passenger restraint device according to a position of a vehicle seat relative to the vehicle passenger restraint device.

2. Description of the Related Art

Referring now to FIG. 1, a vehicle having a vehicle passenger restraint device such as an airbag module mounted within a steering wheel thereof will be discussed hereinafter in order to facilitate understanding of the present invention.

In the vehicle of FIG. 1, when a slidable seat S is in a forward position relative to an airbag module mounted within a steering wheel H, the deployment of an airbag E is controlled so as to be expedited, and when the slidable seat S is in a rearward position relative to the airbag module, the deployment of the airbag E is controlled so as to be delayed.

Hitherto, it has been proposed that a position sensor system P for sensing a position of the vehicle seat relative to the vehicle passenger restraint device is provided at slide rail means R for the vehicle seat in order to control the operation of the vehicle passenger restraint device. A slidable vehicle seat provided with such a position sensor system is disclosed in U.S. Pat. Nos. 5,967,549 and 6,053,529.

Referring now to FIGS. 2 and 3, the vehicle seat provided with the position sensor system that is disclosed in U.S. Pat. No. 6,053,529 will be discussed hereinafter in order to facilitate understanding of the present invention.

A movable rail 1 is attached to the seat in slidable relationship with a stationary rail 2 that is attached to a floor of a vehicle with L-braces 2a. The position sensor system comprises a sensor flange 3 of a generally L-shape in cross-section projecting laterally from a flange side 1a of the movable rail 1, and a magnetic sensor 4 mounted on a support member 5 extending laterally from the stationary rail 2 for sensing the sensor flange 3 position relative thereto and generating a signal representative of seat position to a processor.

As discussed above, the sensor flange 3 is projected laterally from the flange side 1a of the movable rail 1 and the magnetic sensor 4 is mounted on the support member 5 extending laterally from the stationary rail 2. Therefore, when any products, articles or goods of metal accidentally enter a space between the seat and the vehicle floor, there is a possibility that the magnetic sensor 4 will be interfered by such metal products and work improperly. Further, when any longitudinal products, articles or goods, such as umbrellas, accidentally enter the space between the seat and the vehicle floor, there is a possibility that the sensor flange 3 and/or the magnetic sensor 4 will be deformed and/or damaged by such longitudinal products. Furthermore, since the sensor flange 3 and the magnetic sensor 4 are exposed to the outside, dirt and/or dust may easily adhere onto the sensor flange 3 and the magnetic sensor 4. If dirt and/or dust adheres onto the sensor flange 3 and/or the magnetic sensor 4, there is a possibility that the sensing performance of the magnetic sensor will be decreased.

The position sensor system disclosed in U.S. Pat. No. 5,967,549 includes a magnetic actuator, and a device that is responsive to a magnetic field created by the magnetic actuator. The magnetic actuator is operatively coupled to a guide track affixed to a floor of a vehicle. The devise that is responsive to the magnetic field created by the magnetic actuator is attached to a support rail attached to a seat. In the position sensor system, any construction for protecting the magnetic actuator and the magnetic field-responding device from any products, articles or goods that may accidentally enter a space between the seat and the vehicle floor is not devised. Therefore, when any products, articles or goods of metal accidentally enter the space between the seat and vehicle floor, there is a possibility that the device that is responsive to the magnetic field will be interfered with by such products of metal and work improperly. Further, when any longitudinal products, articles or goods, such as umbrellas, accidentally enter the space between the seat and the vehicle floor, there is a possibility that the magnetic actuator and/or the device that is responsive to the magnetic field will be deformed and/or damaged by such longitudinal products. Furthermore, dirt and/or dust may easily adhere onto the magnetic actuator and the device that is responsive to the magnetic field. If dirt and/or dust adheres onto the magnetic actuator and/or the device that is responsive to the magnetic field, there is a possibility that the magnetic sensitivity of the device will be decreased.

In order to protect each of the above position sensor systems from such external factors as discussed above, any protector means for protecting the position sensor system from the external factors, such as a protecting cover, may be additionally employed. However, this results in an increased number of parts making up the vehicle seat. In addition, such additional protector means will restrict a space surrounding the position sensor system.

SUMMARY OF THE INVENTION

The present invention has been made with a view to overcoming the foregoing problems of the prior art position sensor systems.

It is therefore an object of the present invention to provide a position sensor system that is devised so as to be protected from any external factors.

It is another object of the present invention to provide a slidable vehicle seat provided with such a position sensor system as set forth above.

In accordance with one aspect of the present invention, there is provided a position sensor system provided at a slidable vehicle seat for sensing seat position in zones and facilitating controlling of the operation of a vehicle passenger restraint device according to a position of the vehicle seat relative to the vehicle passenger restraint device. The vehicle seat includes a pair of substantially parallel slide rail means. The pair of the slide rail means comprise upper rail members and lower rail members mounted to a floor of a vehicle. The upper rail members are attached to lower portions of the vehicle seat and supported to the lower rail members so as to be movable along the lower rail members, so that the vehicle seat can be moved along the lower rail members. The upper rail members and the lower rail members are combined with each other, to thereby define inner spaces therein. The position sensor system is mounted within at least one of the inner spaces.

In a preferred embodiment according to the present invention, the position sensor system may comprise a sensor unit arranged within one of an upper rail member and lower rail member of one of the pair of the slide rail means and mounted to a predetermined portion of the one of the upper rail member and lower rail member, and a magnetic shielding plate arranged within the other of the upper rail member and lower rail member and mounted to a predetermined portion of the other of the upper rail member and lower rail member. The sensor unit includes a magnetic actuator and an element which is responsive to a magnetic field created by the magnetic actuator. The magnetic actuator and the magnetic field-responding element are spaced apart and opposed to each other. A space between the magnetic actuator and the magnetic field-responding element receives the magnetic shielding plate therein as the vehicle seat is moved along the lower rail members, whereby the passage of a magnetic flux generated by the magnetic actuator is blocked by the magnetic shielding plate.

The position sensor system may further include cleaner means for cleaning the magnetic actuator and the magnetic field-responding element. The cleaner means is arranged within the other of the upper rail member and lower rail member and provided at a second predetermined portion of the other of the upper rail member and lower rail member so as to be received in the space between the magnetic actuator and the magnetic field-responding element as the seat is moved. The cleaner means may comprise a body and cleaner piles provided on the body. Alternatively, the magnetic shielding plate may have cleaner piles provided thereon.

In a preferred embodiment according to the present invention, the position sensor system may comprise a proximity sensor arranged within one of an upper rail member and lower rail member of one of the pair of the slide rail means and mounted to a predetermined portion of the one of the upper rail member and lower rail member, and metallic and nonmetallic portions being sensed by said proximity sensor. The metallic portion and the nonmetallic portion are provided at a first predetermined portion of the other of the upper rail member and lower rail member and a second predetermined portion of the other of the upper rail member and lower rail member, respectively.

In a preferred embodiment according to the present invention, the position sensor system may comprise a magnet arranged within one of an upper rail member and lower rail member of one of the pair of the slide rail means and mounted to a predetermined portion of the one of the upper rail member and lower rail member, and a magnetic sensor arranged within the other of the upper rail member and lower rail member and mounted to a predetermined portion of the other of the upper rail member and lower rail member so as to be opposed to the magnet.

The magnet may comprise a strip-shaped magnet. The strip-shaped magnet may have chamfered upper edge portions extending along a longitudinal direction thereof and sloping downward. The magnet may be mounted to the predetermined portion of the one of the upper rail member and lower rail member through an iron plate serving as a yoke.

The one of the upper rail member and lower rail member may have a frame portion provided at the predetermined portion thereof The magnet may be received in and supported by the frame portion. The frame portion may be formed by causing the predetermined portion of the one of the upper rail member and lower rail member to be protruded inwardly.

The one of said upper rail member and lower rail member may have a recess portion provided at the predetermined portion thereof. The magnet may be received in the recess portion.

The one of the upper rail member and lower rail member may have a pair of spaced apart rising pieces formed by causing regions of the predetermined portion thereof to be cut and causing the regions to rise up inwardly. The magnet may be interposed between the spaced apart rising pieces and retained by the spaced apart rising pieces.

The magnet may be housed in and positioned by a case that is mounted to the predetermined portion of the one of the upper rail member and lower rail member. The case may comprise a frame-shaped case. The case may comprise a body of a substantially quadrangular, truncated pyramid shape in outline.

The case may comprise a base plate, rising portions rising up from front and rear sides of the base plate, slope portions extending from upper ends of the rising portions and obliquely sloping down, mounting pieces extending horizontally from lower ends of the slope portions, and engaging pieces provided at both sides of the base plate so as to rise up from the both sides of the base plate. The magnet may be carried on the base plate and retained by the rising portions and the engaging pieces.

The other of the upper rail member and lower rail member may have an opening formed in the predetermined portion thereof. The magnetic sensor may be provided with an armor case having a flange portion. The magnetic sensor is mounted to the predetermined portion of the other of the upper rail member and lower rail member with the armor case being fitted through the opening, and with the flange portion covering the opening.

The armor case may have a pair of spaced apart spring clips provided at both sides thereof. The magnetic sensor is mounted to the predetermined portion of the other of the upper rail member and lower rail member with the armor case being inserted through the opening, with the spring clips being engaged with an edge of the opening, and with the flange portion being pressed against the other of the upper rail member and lower rail member due to actions of the spring clips.

The flange portion may be provided with an applying piece protruding laterally from the flange portion. The magnetic sensor is mounted to the predetermined portion of the other of the upper rail member and lower rail member by causing the applying piece to be secured to the predetermined portion of the other of the upper rail member and lower rail member by means of a tapping screw.

The position sensor system may further include cleaner means for cleaning the magnet. The cleaner means is arranged within the other of the upper rail member and lower rail member and mounted to a second predetermined portion of the other of the upper rail member and lower rail member. The cleaner means may comprise a body mounted to the second predetermined portion of the upper rail member and lower rail member, and cleaner piles provided on the body.

In a preferred embodiment according to the present invention, the position sensor system comprises a magnet arranged within a lower rail member of one of the pair of the slide rail means and mounted to a predetermined portion of the lower rail member, and a magnetic sensor arranged within an upper rail member of the one of the pair of the slide rail means and mounted to a predetermined portion of the upper rail member. The slidable vehicle seat further includes driving means for automatically moving the slidable vehicle seat along the lower rail members. The driving means is arranged within each of the pair of the slide rail means.

The driving means may comprise a lead screw extending along the longitudinal direction of a corresponding lower rail member, the lead screw being supported at both ends thereof to bracket plates secured on the corresponding lower rail member, gear means meshed with the lead screw so as to be movable relative to the lead screw, and a gear box housing the gear means and mounted to an inner surface of a corresponding upper rail member. The position sensor system further includes a holder mounted on one of bracket plates secured on the lower rail member of the one of the pair of the slide rail means. The magnet is held by the holder.

The one of the bracket plates may comprises a body of substantially L-shape having a vertical section and a horizontal section. The horizontal section is secured on the corresponding lower rail member and provided with an engaging piece. The holder is formed with a slit. The engaging piece of the bracket is engaged with said slit.

In accordance with another aspect of the present invention, there is provided a slidable vehicle seat. The vehicle seat comprises a pair of substantially parallel slide rail means including upper rail members and lower rail members mounted to a floor of a vehicle, the upper rail members being attached to lower portions of the vehicle seat and supported to the lower rail members so as to be movable along the lower rail members, so that the vehicle seat can be moved along the lower rail members, the upper rail members and the lower rail members being combined with each other, to thereby define inner spaces therein, and a position sensor system for sensing seat position in zones and facilitating controlling of the operation of a vehicle passenger restraint device according to a position of the vehicle seat relative to the vehicle passenger restraint device, the position sensor system being mounted within at least one of the inner spaces.

In a preferred embodiment according to the present invention, the position sensor system may comprise a sensor unit arranged within one of an upper rail member and lower rail member of one of the slide rail means and mounted to a predetermined portion of the one of the upper rail member and lower rail member, and a magnetic shielding plate arranged within the other of the upper rail member and lower rail member and mounted to a predetermined portion of the other of the upper rail member and lower rail member. The sensor unit includes a magnetic actuator and an element which is responsive to a magnetic field created by the magnetic actuator. The magnetic actuator and the magnetic field-responding element are spaced apart and opposed to each other. A space between the magnetic actuator and the magnetic field-responding element receives the magnetic shielding plate therein as the vehicle seat is moved along the lower rail members, whereby the passage of a magnetic flux generated by the magnetic actuator is blocked by the magnetic shielding plate.

The position sensor system may further include cleaner means for cleaning the magnetic actuator and the magnetic field-responding element. The cleaner means is arranged within the other of the upper rail member and lower rail member and provided at a second predetermined portion of the other of the upper rail member and lower rail member so as to be received in the space between the magnetic actuator and the magnetic field-responding element as the seat is moved. The cleaner means may comprise a body and cleaner piles provided on the body. Alternatively, the magnetic shielding plate may have cleaner piles provided thereon.

In a preferred embodiment according to the present invention, the position sensor system may comprise a proximity sensor arranged within one of an upper rail member and lower rail member of one of the pair of the slide rail means and mounted to a predetermined portion of the one of the upper rail member and lower rail member, and metallic and nonmetallic portions being sensed by said proximity sensor. The metallic portion and the nonmetallic portion are provided at a first predetermined portion of the other of the upper rail member and lower rail member and a second predetermined portion of the other of the upper rail member and lower rail member, respectively.

In a preferred embodiment according to the present invention, the position sensor system may comprise a magnet arranged within one of an upper rail member and lower rail member of one of the pair of the slide rail means and mounted to a predetermined portion of the one of the upper rail member and lower rail member, and a magnetic sensor arranged within the other of the upper rail member and lower rail member and mounted to a predetermined portion of the other of the upper rail member and lower rail member so as to be opposed to the magnet.

The magnet may comprise a strip-shaped magnet. The strip-shaped magnet may have chamfered upper edge portions extending along a longitudinal direction thereof and sloping downward. The magnet may be mounted to the predetermined portion of the one of the upper rail member and lower rail member through an iron plate serving as a yoke.

The one of the upper rail member and lower rail member may have a frame portion provided at the predetermined portion thereof. The magnet is received in and supported by the frame portion. The frame portion may be formed by causing the predetermined portion of the one of the upper rail member and lower rail member to be protruded inwardly.

The one of the upper rail member and lower rail member may have a recess portion provided at the predetermined portion thereof. The magnet may be received in the recess portion.

The one of the upper rail member and lower rail member may have a pair of spaced apart rising pieces formed by causing regions of the predetermined portion thereof to be cut and causing the regions to rise up inwardly. The magnet may be interposed between the spaced apart rising pieces and retained by the spaced apart rising pieces.

The magnet may be housed in and positioned by a case that is mounted to the predetermined portion of the one of the upper rail member and lower rail member. The case may comprise a frame-shaped case. The case may comprise a body of a substantially quadrangular, truncated pyramid shape in outline.

The case may comprise a base plate, rising portions rising up from front and rear sides of the base plate, slope portions extending from upper ends of the rising portions and obliquely sloping down, mounting pieces extending horizontally from lower ends of the slope portions, and engaging pieces provided at both sides of the base plate so as to rise up from the both sides of the base plate. The magnet may be carried on the base plate and retained by the rising portions and the engaging pieces.

The other of the upper rail member and lower rail member may have an opening formed in the predetermined portion thereof. The magnetic sensor may be provided with an armor case having a flange portion. The magnetic sensor is mounted to the predetermined portion of the other of the upper rail member and lower rail member with the armor case being fitted through the opening, and with the flange portion covering the opening.

The armor case may have a pair of spaced apart spring clips provided at both sides thereof. The magnetic sensor is mounted to the predetermined portion of the other of the upper rail member and lower rail member with the armor case being inserted through the opening, with the spring clips being engaged with an edge of the opening, and with the flange portion being pressed against the other of the upper rail member and lower rail member due to actions of the spring clips.

The flange portion may be provided with an applying piece protruding laterally from the flange portion. The magnetic sensor is mounted to the predetermined portion of the other of the upper rail member and lower rail member by causing the applying piece to be secured to the predetermined portion of the other of the upper rail member and lower rail member by means of a tapping screw.

The position sensor system may further include cleaner means for cleaning the magnet. The cleaner means is arranged within the other of the upper rail member and lower rail member and mounted to a second predetermined portion of the other of the upper rail member and lower rail member. The cleaner means may comprise a body mounted to the second predetermined portion of the upper rail member and lower rail member, and cleaner piles provided on the body.

In a preferred embodiment according to the present invention, the position sensor system comprises a magnet arranged within a lower rail member of one of the pair of the slide rail means and mounted to a predetermined portion of the lower rail member, and a magnetic sensor arranged within an upper rail member of the one of the pair of the slide rail means and mounted to a predetermined portion of the upper rail member. The slidable vehicle seat further includes driving means for automatically moving the slidable vehicle seat along the lower rail members. The driving means is arranged within each of the pair of the slide rail means.

The driving means may comprise a lead screw extending along the longitudinal direction of a corresponding lower rail member, the lead screw being supported at both ends thereof to bracket plates secured on the corresponding lower rail member, gear means meshed with the lead screw so as to be movable relative to the lead screw, and a gear box housing the gear means and mounted to an inner surface of a corresponding upper rail member. The position sensor system further includes a holder mounted on one of bracket plates secured on the lower rail member of the one of the pair of the slide rail means. The magnet is held by the holder.

The one of the bracket plates may comprises a body of substantially L-shape having a vertical section and a horizontal section. The horizontal section is secured on the corresponding lower rail member and provided with an engaging piece. The holder is formed with a slit. The engaging piece of the bracket is engaged with said slit.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals denote the same parts throughout the Figures and wherein.

DETAILED DESCRIPTION OF THE PREFERRED EMBODIMENTS

Figure 1:
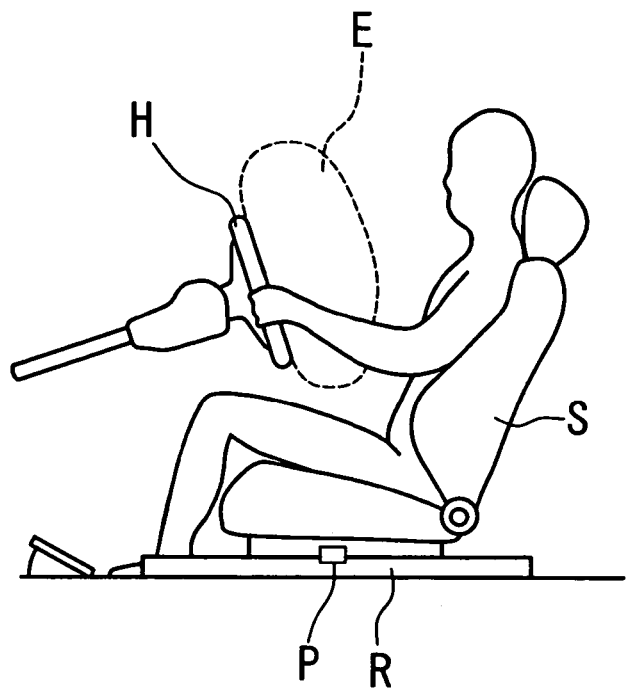
FIG. 1 is a schematic view of a typical vehicle seat provided with a position sensor system.
Figure 2:
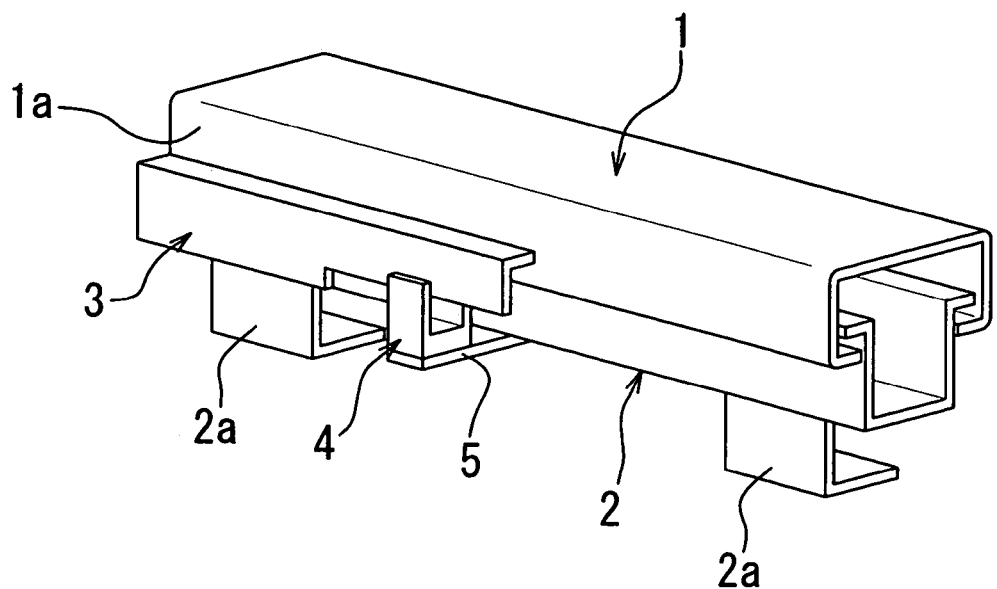
FIG. 2 is a schematic perspective view of assistance in explaining a conventional position sensor system.
Figure 3:
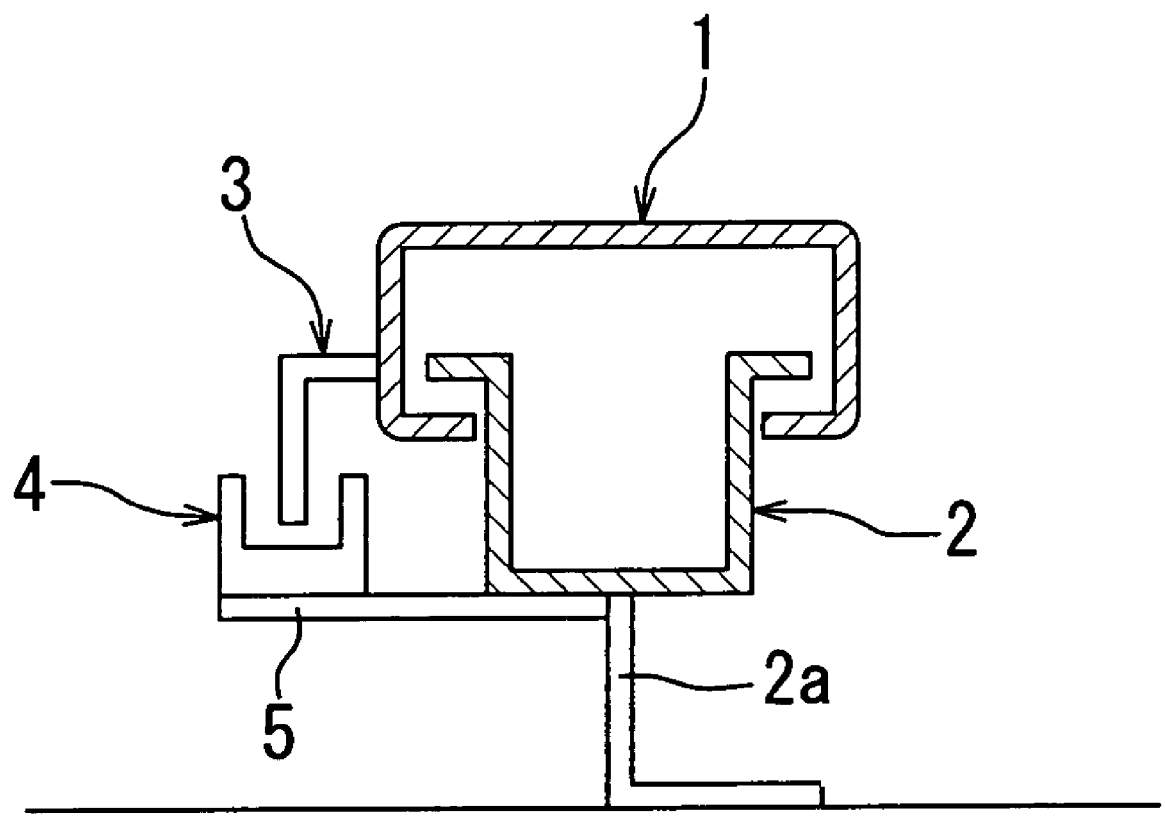
FIG. 3 is a schematic partially sectional view of the conventional position sensor system shown in FIG. 2.

A position sensor system for facilitating controlling of the operation of a vehicle passenger restraint device and a slidable vehicle seat provided with the position sensor system according to the present invention will be discussed hereinafter with reference to the accompanying drawings. The present invention is applied to such a slidable vehicle seat as shown in FIG. 1.

The slidable vehicle seat generally includes a pair of substantially parallel slide rail means, and a position sensor system mounted within at least one of the pair of the slide rail means for sensing a position of the seat relative to a vehicle passenger restraint device, generating a signal representative of seat position in zones, and sending the signal to a controller including, for example, a CPU. The controller is provided at a predetermined portion of a vehicle, electrically connected to the passenger restraint device and the position sensor system, and adapted to receive the signal from the position sensor system, process the signal and control the operation of the passenger restraint device. The seat is mounted to a vehicle floor for longitudinally slidable movement by the pair of the slide rail means.

Figure 4:
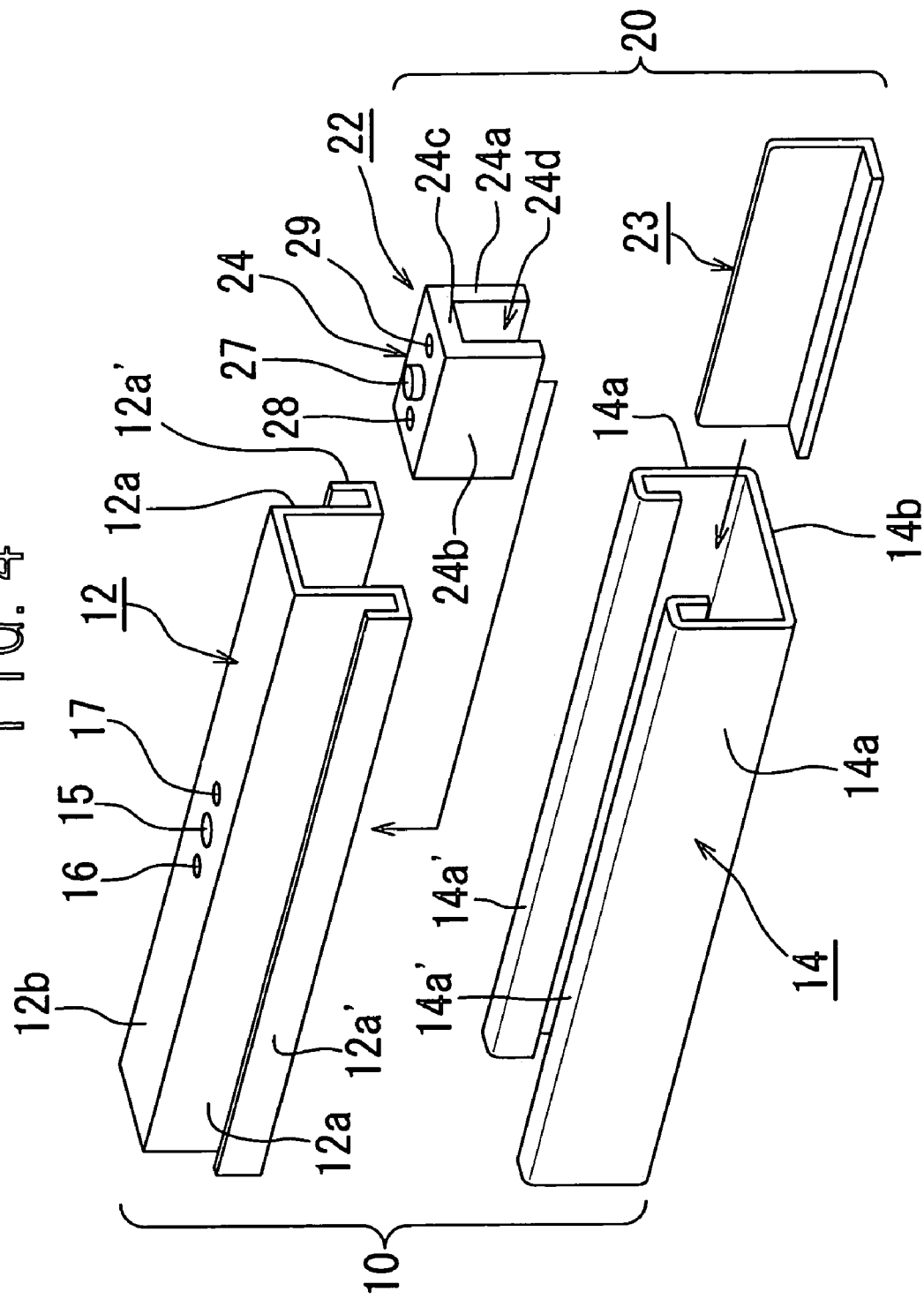
FIG. 4 is a schematic exploded perspective view of assistance in explaining a position sensor system according to a first embodiment of the present invention.

Referring to FIG. 4, there is illustrated the slide rail means 10 (only one slide rail means 10 is shown in FIG. 4) and the position sensor system 20 according to a first embodiment of the present invention. The pair of the slide rail means 10 comprise upper rail members 12 attached to lower portions of the seat, and lower rail members 14 mounted to the vehicle floor. The upper rail members 12 attached to the seat are slidably supported through rollers (not shown) to the lower rail members 14, whereby the seat can be moved forward and rearward along the lower rail members 14. The position sensor system 20 is mounted within at least one of the pair of the slide rail means 10 and comprises a position sensor unit 22 and an elongated magnetic shielding plate 23 of a substantially L-shape in cross-section.

Each of the upper rail members 12 comprises a longitudinal body of a substantially inverted U-shape in cross-section. The longitudinal body of the upper rail member 12 comprises a pair of spaced apart side plate sections 12a and a top plate section 12b interconnecting the side plate sections 12a. Each of the side plate sections 12a of the upper rail member 12 is provided with an outward and upward-turned lengthwise extending flange 12a' of a substantially L-shape in cross-section along a lower end thereof. The top plate sections 12b of the upper rail member 12 of the one of the pair of the slide rail means 10 is formed with a positioning hole 15 for use in positioning the position sensor unit 22 with respect to the top plate section 12b of the upper rail member 12, and through-holes 16, 17 for use in mounting the sensor unit 22 to the top plate section 12b of the upper rail member 12 by fastening bolts (not shown) which are screwed into the holes 16, 17 as will be discussed hereinafter. The holes 15–17 are formed in the approximately middle portion of the longitudinal direction of the top plate section 12b.

Each of the lower rail members 14 comprises a longitudinal body of a substantially U-shape in cross-section. Like the longitudinal body of the upper rail member 12, the longitudinal body of the lower rail member 14 comprises a pair of spaced apart side plate sections 14a and a bottom plate section 14b interconnecting the side plate sections 14a. Each of the side plate sections 14a of the lower rail member 14 is provided with an inward and downward-turned lengthwise extending flange 14a' of a substantially L-shape in cross-section along an upper end thereof.

The upper rail members 12 are slidably supported to the lower rail members 14 with the flanges 12a' thereof being received in the flanges 14a' of the lower rail members 14. The inner spaces of the pair of the slide rail means 10 are defined by combining the upper rail members 12 and the lower rail members 14 and isolated from the outside.

As the passenger restraint device, there may be employed an airbag module which includes such as an airbag and an inflator, and which may be mounted within a steering wheel or an instrument panel. As will be discussed in greater in detail hereinafter, when the seat is in a forward position and a rearward position relative to the passenger restraint device, the position sensor unit 22 senses the positions of the seat, generates a first control signal representative of the seat being in the forward position, and a second control signal representative of the seat being in the rearward position, and sends the signals to the controller. The controller is constructed so as to expedite the deployment of the deployable passenger restraint device when the controller receives the first control signal from the position sensor unit 22, and delay the deployment of the deployable passenger restraint device when the controller receives the second control signal from the position sensor unit 22.

Figure 5:
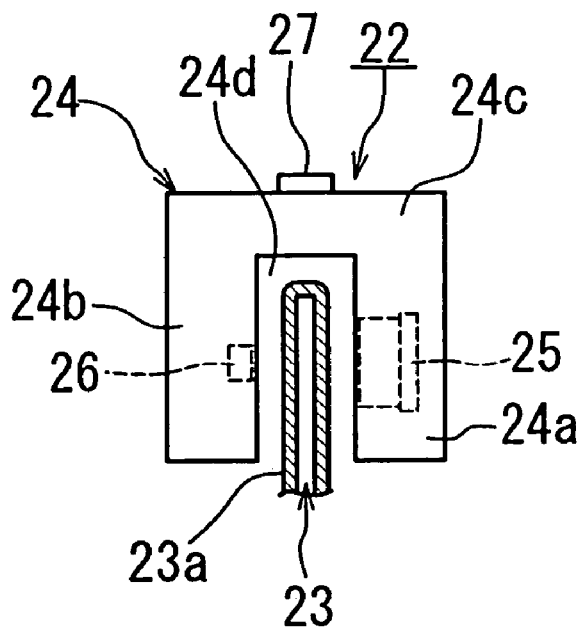
FIG. 5 is a schematic front view of a position sensor unit employed in the position sensor system of FIG. 4.

Referring again to FIG. 4 and referring to FIG. 5, the position sensor unit 22 comprises a housing 24 of a substantially inverted U-shape in cross-section which has spaced apart leg portions 24a, 24b and a top plate section 24c interconnecting the spaced apart leg portions 24a, 24b, a magnetic actuator 25 creating a magnetic field, e.g., a magnetic piece or electromagnet, the magnetic actuator 25 being provided in one 24a of the leg portions, and an element 26 which is responsive to the magnetic field created by the magnetic actuator 25, the magnetic field-responding element 26 including, for example, a Hall element or Hall integrated circuit and being provided in the other 24b of the leg portions so as to be opposed to or aligned with the magnetic actuator 25. The top plate section 24c of the housing 24 is provided with a positioning projection 27 protruding upward therefrom, and holes 28, 29.

Figure 6:
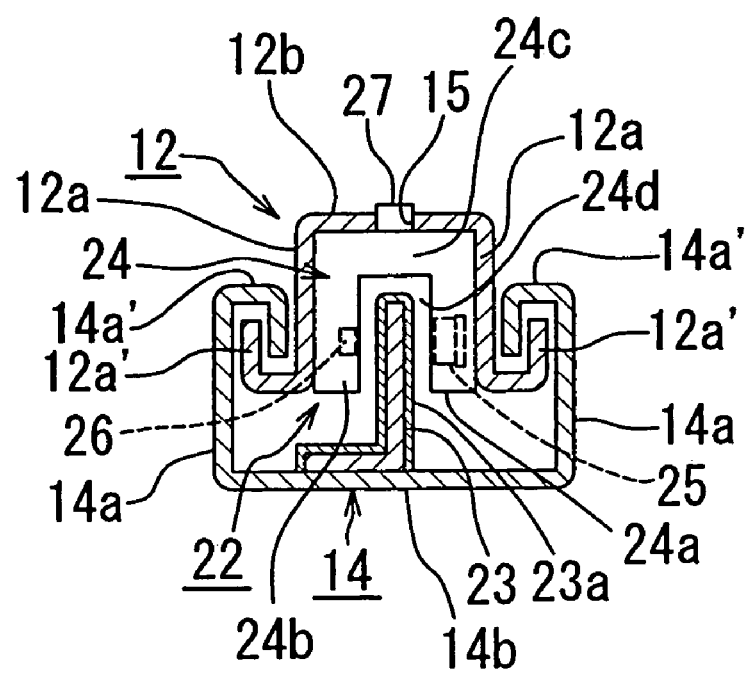
FIG. 6 is a schematic sectional view of the position sensor system of FIG. 4.

Referring to FIG. 6, the position sensor unit 22 is housed within and mounted with respect to the inverted U-shaped upper rail member 12 of the one of the pair of the slide rail means 10 with the positioning projection 27 thereof being fitted in the positioning hole 15 of the upper rail member 12 and with the top plate section 24c thereof being secured to the top plate section 12b of the upper rail member 12 by causing the unshown fastening bolts to be screwed into the through-holes 16, 17 (see FIG. 4) of the top plate section 12b of the upper rail member 12 and the holes 28, 29 (see FIG. 4) of the top plate section 24c of the housing 24. As discussed above, the holes 15-17 are formed in the approximately middle portion of the longitudinal direction of the top plate section 12b. Thus, the position sensor unit 22 is arranged at the approximately middle portion of the longitudinal direction of the upper rail member 12.

The magnetic shielding plate 23 is mounted to the bottom plate section 14b of the lower rail member 14 of the one of the pair of the slide rail means 10, stands up from an inner surface of the bottom plate section 14b, and has a height sufficient to block the passage of a magnetic flux generated by the magnetic actuator 25. In the illustrated example, the position sensor unit 22 is arranged at the approximately middle portion of the longitudinal direction of the upper rail member 12 as described above, whereas the magnetic shielding plate 23 extends over a region of the bottom plate section 14b of the lower rail member 14 which is more rear than the approximately middle portion of the longitudinal direction of the bottom plate section 14b. When the seat is moved to the rearward position, the magnetic shielding plate 23 is received in a space 24d between the magnetic actuator 25 and the magnetic field-responding element 26, whereby the passage of the magnetic flux generated by the magnetic actuator 25 is blocked by the magnetic shielding plate 23 so as not to reach the magnetic field-responding element 26. In order to prevent dirt and/or dust from adhering on the magnetic shielding plate 23, the magnetic shielding plate 23 may be covered with a resin covering 23a.

The position sensor unit 22 is operative to sense seat position in two zones, including a first zone in which the position sensor unit 22 is withdrawn from the magnetic shielding plate 23 or the seat is in the forward position, and a second zone in which the seat has been moved such that the space 24d between the magnetic actuator 25 and the magnetic field-responding element 26 receives the magnetic shielding plate 23 therein, or the seat is in the rearward position.

The magnetic field-responding element 26 is electrically connected to the controller (not shown) through a signal cable (not shown), and constructed so as to generate a first electric signal representative of the seat being in the first zone or in the forward position when the position sensor unit 22 is withdrawn from the magnetic shielding plate 23, and generate a second electric signal representative of the seat being in the second zone or in the rearward position when the space 24d between the magnetic actuator 25 and the magnetic field-responding element 26 receives the magnetic shielding plate 23 therein. The controller is constructed such that when it receives the first electric signal from the magnetic field-responding element 26, the controller processes the first electric signal and controls the passenger restraint device so as to cause the deployment of the passenger restraint device to be expedited, and when the controller receives the second electric signal from the magnetic field-responding element 26, the controller processes the second electric signal and controls the passenger restraint device so as to cause the deployment of the passenger restraint device to be delayed.

Figure 7:
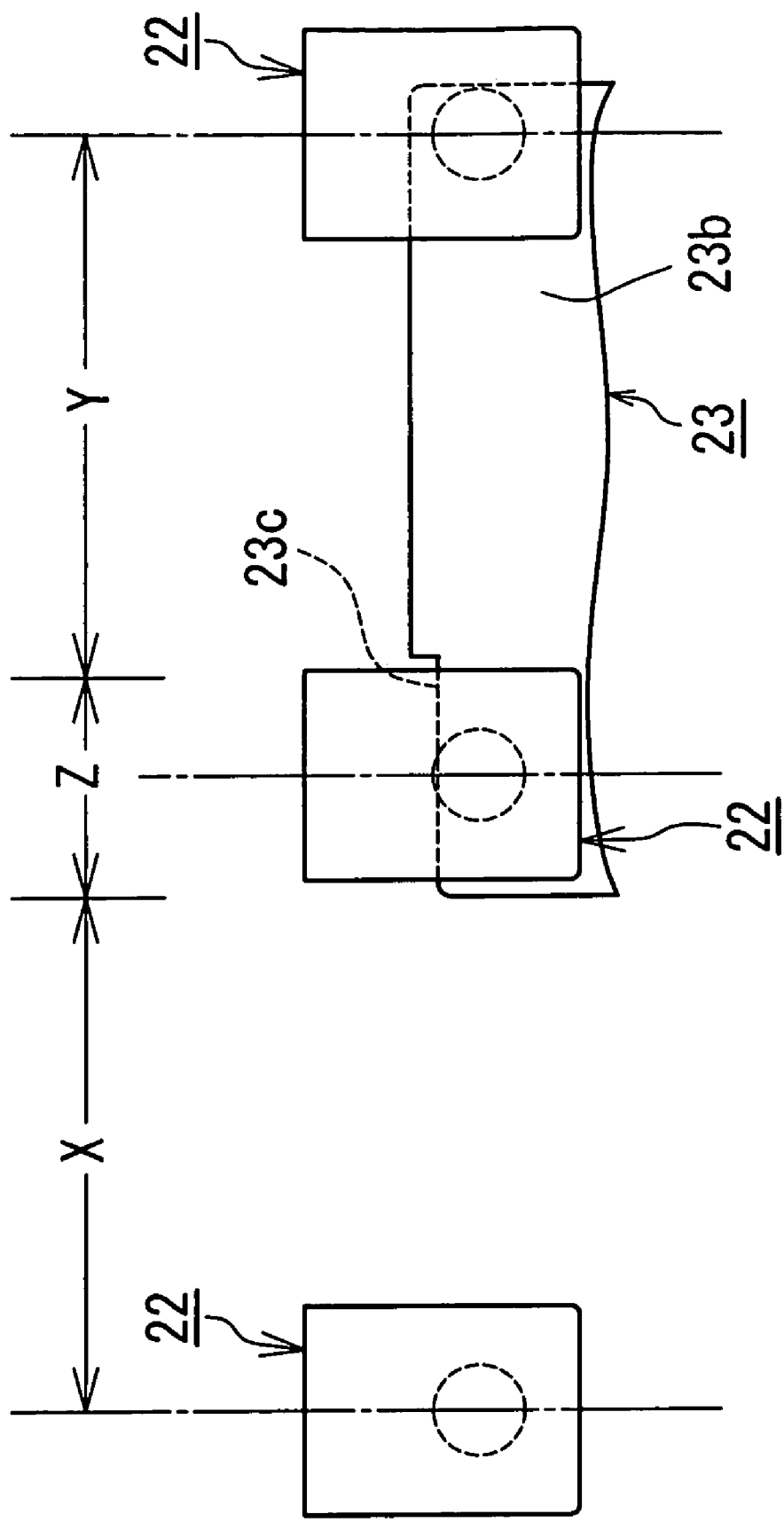
FIG. 7 is a schematic view of assistance in explaining a modification of a magnetic shielding plate employed in the position sensor system of FIG. 4.

Referring to FIG. 7, the magnetic shielding plate 23 may comprise a first section 23b having a first vertical height and a second section 23c having a second vertical height being lower than the first vertical height, the second section 23c being formed by causing a forward portion of the magnetic shielding plate 23 to be cut out. Such a construction allows seat position sensing in three zones, including a first zone X in which the position sensor unit 22 is withdrawn from the magnetic shielding plate 23, a second zone Y in which the space 24d (see FIGS. 5 and 6) between the magnetic actuator 25 and the magnetic field-responding element 26 receives the first section 23b of the magnetic shielding plate 23 therein, and a third zone Z in which the space 24d between the magnetic actuator 25 and the magnetic field-responding element 26 receives the second section 23c of the magnetic shielding plate 23 therein. It should be understood that the passage of the magnetic flux generated by the magnetic actuator 25 is not blocked in the first zone X by the magnetic shielding plate 23, the passage of the magnetic flux generated by the magnetic actuator 25 is blocked in the second zone Y by the first section 23b of the magnetic shielding plate 23, and the passage of the magnetic flux generated by the magnetic actuator 25 is blocked by the second section 23c of the magnetic shielding plate 23. In this example, when the position sensor unit 22 is withdrawn from the magnetic shielding plate 23, the magnetic field-responding element 26 generates a first electric signal representative of the seat being in the first zone X or in the forward position. When the space 24d between the magnetic actuator 25 and the magnetic field-responding element 26 receives the first section 23b of the magnetic fielding plate 23 therein, the magnetic field-responding element 26 generates a second electric signal representative of the seat being in the second zone Y or in the rearward position. Further, when the space 24d between the magnetic actuator 25 and the magnetic filed-responding element 26 receives the second section 23c of the magnetic fielding plate 23 therein, the magnetic field-responding element 26 generates a third electric signal representative of the seat being in the third zone Z or in a middle position between the forward position and the rearward position. In this instance, the controller is constructed such that when it receives the first electric signal from the magnetic field-responding element 26, the controller processes the first electric signal and controls the passenger restraint device so as to cause the deployment of the passenger restraint device to be expedited, that when the controller receives the second electric signal from the magnetic field-responding element 26, the controller processes the second electric signal and controls the passenger restraint device so as to cause the deployment of the passenger restraint device to be delayed, and that when the controller receives the third electric signal from the magnetic field-responding element 26, the controller processes the third electric signal and causes the passenger restraint device to be commonly deployed.

In the seat according to the first embodiment of the present invention, the position sensor system 20 is mounted within the inner space defined by the upper rail member 12 and the lower rail member 14, so that the position sensor system 20 can be prevented from being seriously affected by any external factor and the position sensor system 20 can always operate in order. Furthermore, even though any longitudinal products such as umbrellas accidentally enter a space between the vehicle floor and the seat, the position sensor system 20 is not damaged by such longitudinal products. In addition, an additional bracket for use in mounting the position sensor unit, and an additional cover for protecting the position sensor system 20 are not required, so that an increased number of the parts making up the vehicle seat can be prevented. Also, the position sensor unit 20 is arranged within the upper rail member 12 and the magnetic shielding plate 23 is arranged within the lower rail member 14, so that higher precision for relative positions of the position sensor unit 22 and the magnetic shielding plate 23 can be assured. Further, a clearance between the position sensor unit 22 and the magnetic shielding plate 23 can be kept small, so that sensor performance can be improved. Particularly, the position sensor unit 22 is housed and mounted within the upper rail member 12 with an opening side of the substantially U-shaped housing 24 thereof facing downwardly, so that even if dirt and/or dust should adhere on the position sensor unit 22, dirt and/or dust can be prevented from lying on the position sensor unit 22. Therefore, the sensor performance can be prevented from being lowered by dirt and/or dust.

Incidentally, while the position sensor unit 22 and the magnetic shielding plate 23 are attached to the upper rail member 12 and the lower rail member 14, respectively, in the illustrated embodiment, the position sensor unit 22 and the magnetic shielding plate 23 may be mounted to the lower rail member 14 and the upper rail member 12, respectively. Further, while the magnetic shielding plate 23 is arranged at the rearward portion of the bottom plate section 14b of the lower rail member 14, it may be arranged at the forward portion of the bottom plate section 14b of the lower rail member 14.

Figure 8:
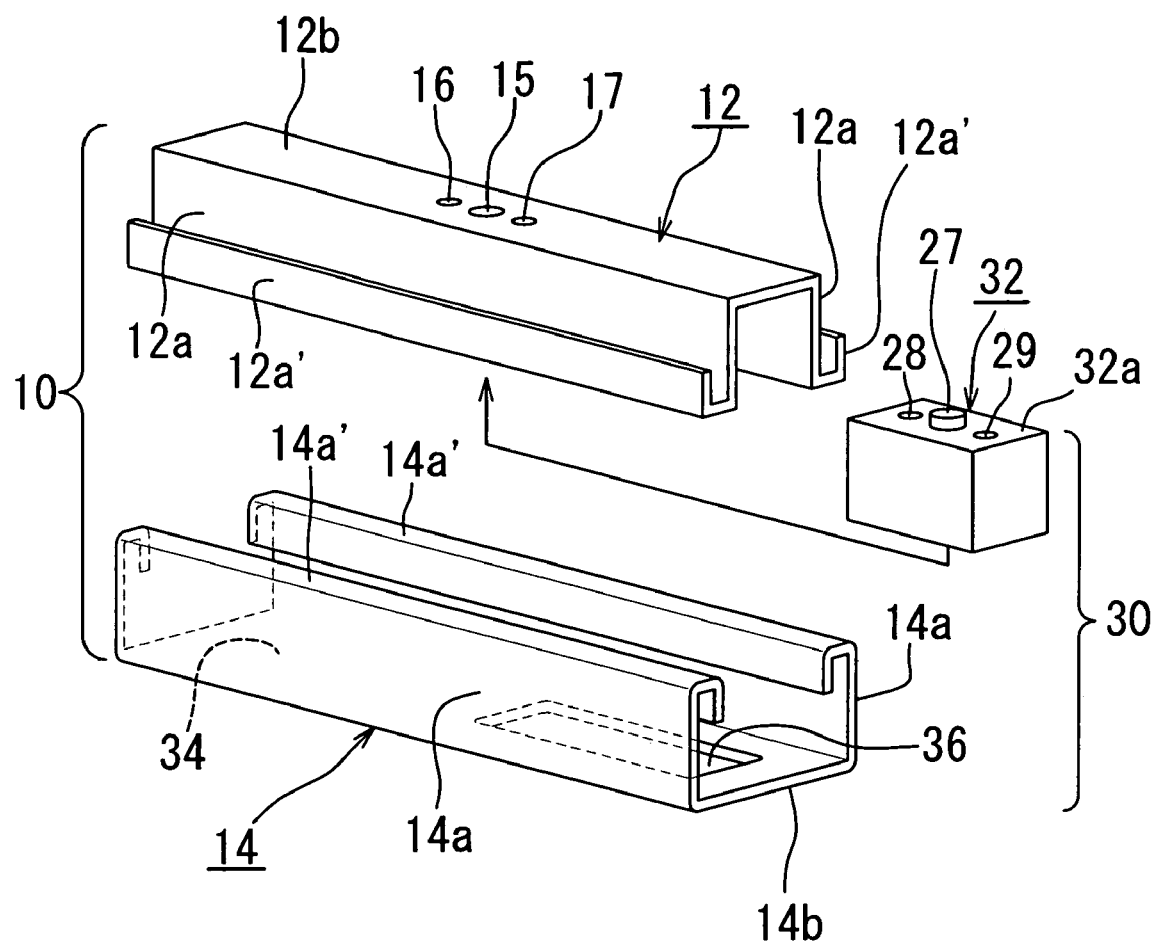
FIG. 8 is a schematic exploded perspective view of assistance in explaining a position sensor system according to a second embodiment of the present invention.
Figure 9:
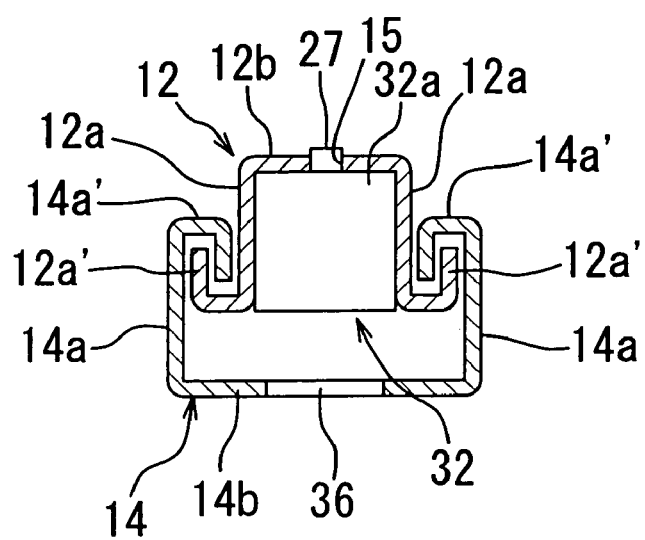
FIG. 9 is a schematic sectional view of the position sensor system shown in FIG. 8.

Referring to FIGS. 8 and 9, there is illustrated a vehicle seat provided with a position sensor system according to a second embodiment of the present invention. The vehicle seat according to the second embodiment of the present invention is substantially similar to that according to the first embodiment of the present invention except that a different position sensor system 30 is employed. In FIGS. 8 and 9, components that are substantially similar to those of the vehicle seat according to the first embodiment of the present invention are denoted by the same reference numerals. The description of them will not be repeated hereinafter.

The position sensor system 30 according to the second embodiment of the present invention comprises a high-frequency oscillating-type proximity sensor 32, and metallic and nonmetallic portions 34, 36 which serve as objects to be sensed by the proximity sensor 32 and are provided in the bottom plate section 14b of the lower rail member 14. In this embodiment, the lower rail member 14 is made of metal. The nonmetallic portion 36 is provided in a region of the bottom plate section 14b which is more rear than the approximately middle portion of the longitudinal direction of the bottom plate section 14b. Thus, a portion of the bottom plate section 14b at which the nonmetallic portion 36 is not provided serves as the metallic portion 34 to be sensed by the proximity sensor 32. The nonmetallic portion 36 may comprise a hole or slit.

The proximity sensor 32 includes a box-like housing 32a having a high-frequency oscillating section (not shown) housed therein, the high-frequency oscillating section including for example an oscillation coil, a positioning projection 27 projecting upward from an upper surface of the housing 32a, and holes 28, 29 formed in the upper surface of the housing 32a. The proximity sensor 32 is arranged within the upper rail member 12 and secured to the top plate section 12b of the upper rail member 12 in the same manner as the position sensor unit 22 according to the first embodiment of the present invention is done with respect to the top plate section 12b of the upper rail member 12. More particularly, the proximity sensor 32 is secured to the top plate section 12b of the upper rail member 12 by fastening bolts (not shown) which are screwed through the holes 16, 17 of the upper rail member 12 and screwed into the holes 28, 29 of the proximity sensor 32, with the high-frequency oscillating section being opposed to the bottom plate section 14b of the lower rail member 14, and with the positioning projection 27 being fitted in the positioning hole 15 of the upper rail member 12.

In the second embodiment, when the proximity sensor 32 is operatively opposed to the metallic portion 34 as the seat is moved, the amplitude of oscillation damps due to eddy current loss and when the proximity sensor 32 is operatively opposed to the nonmetallic portion 36 as the seat is moved, the amplitude of oscillation is kept constant. Thus, the proximity sensor 32 is operative to sense seat position in two zone, including a first zone in which the proximity sensor 32 is operatively opposed to the metallic portion 34 or the seat is in the forward position, and a second zone in which the proximity sensor 32 is operatively opposed to the nonmetallic portion 36 or the seat is in the rearward position. The proximity sensor 32 is electrically connected to the controller through a signal cable (not shown) and constructed so as to generate a first electric signal representative of the seat being in the forward position and a second electric signal representative of the seat being in the rearward position. When the controller receives the first electric signal from the proximity sensor 32, the controller processes the first electric signal and controls the passenger restraint device so as to cause the deployment of the passenger restraint device to be expedited. Further, when the controller receives the second electric signal from the proximity sensor 30, the controller processes the second electric signal and controls the passenger restraint device so as to cause the passenger restraint device to be delayed.

A plurality of holes or slits which are relatively smaller than the nonmetallic portion 36 may be formed in the approximately middle portion of the longitudinal direction of the bottom plate section 14b. Such a construction allows seat position sensing in three zones, including a first zone in which the proximity sensor 32 is operatively opposed to the metallic portion 34 as the seat is moved, a second zone in which the proximity sensor 32 is operatively opposed to the nonmetallic portion 36 as the seat is moved, and a third zone in which the proximity sensor 32 is operatively opposed to the small-sized holes between the metallic portion 34 and the nonmetallic portion 36 as the seat is moved. In this instance, the proximity sensor 32 is constructed so as to generate a first electric signal representative of the seat being in the first zone or in the forward position, a second electric signal representative of the seat being in the second zone or in the rearward position, and a third signal representative of the seat being in the third zone or in a middle position between the forward and rearward positions. The controller is constructed such that when it receives the first electric signal from the proximity sensor 32, the controller processes the first electric signal and controls the passenger restraint device so as to cause the deployment of the passenger restraint device to be expedited. When the controller receives the second electric signal from the proximity sensor 32, it processes the second electric signal and controls the passenger restraint device so as to cause the deployment of the passenger restraint device to be delayed. Further, when the controller receives the third electric signal from the proximity sensor 32, it processes the third electric signal and causes the passenger restraint device to be commonly deployed.

In the second embodiment, such a magnetic shielding plate 23 as employed in the first embodiment is not required, so that as compared with the position sensor system according to the first embodiment, the number of the parts can be reduced. In addition, as compared with the slide rail means of the seat according to the first embodiment of the present invention, the weight lightening and miniaturizing of the slide rail means according to the second embodiment of the present invention can be achieved. Like the position sensor system 20 according to the first embodiment of the present invention, the position sensor system 30 according to the second embodiment of the present invention is mounted within the inner space defined by the upper rail member 12 and the lower rail member 14. Therefore, the second embodiment can provide the same effects as the first embodiment can do.

Incidentally, while the nonmetallic portion 36 is provided at the rearward portion of the bottom plate section 14b of the lower rail member 12 in the second embodiment, it may be provided at the forward portion of the bottom plate section 14*b* of the lower rail member 14. Further, while the proximity sensor 32 and the nonmetallic portion 36 are provided at the upper rail member 12 and the lower rail member 14, respectively, in the second embodiment, the proximity sensor 32 and the nonmetallic portion 36 may be provided at the lower rail member 14 and the upper rail member 12, respectively.

Figure 10:
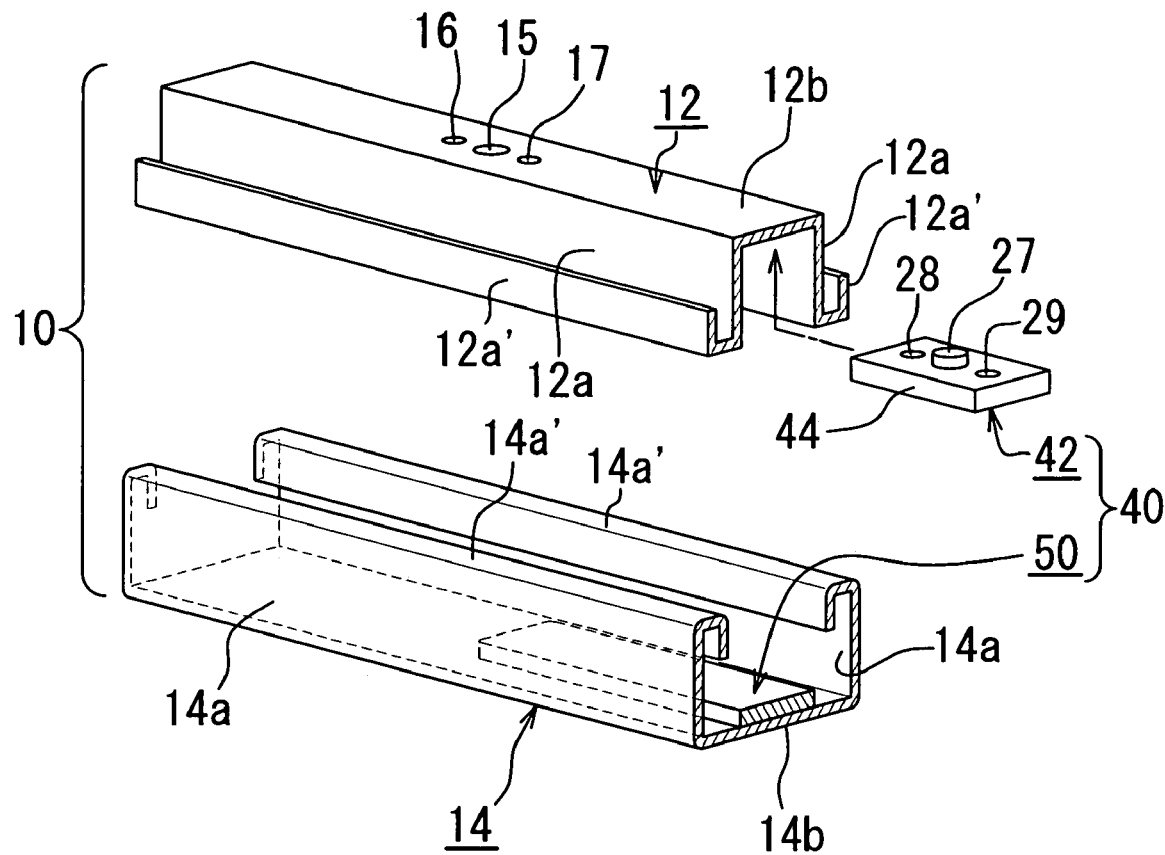
FIG. 10 is a schematic exploded perspective view of assistance in explaining a position sensor system according to a third embodiment of the present invention.
Figure 11:
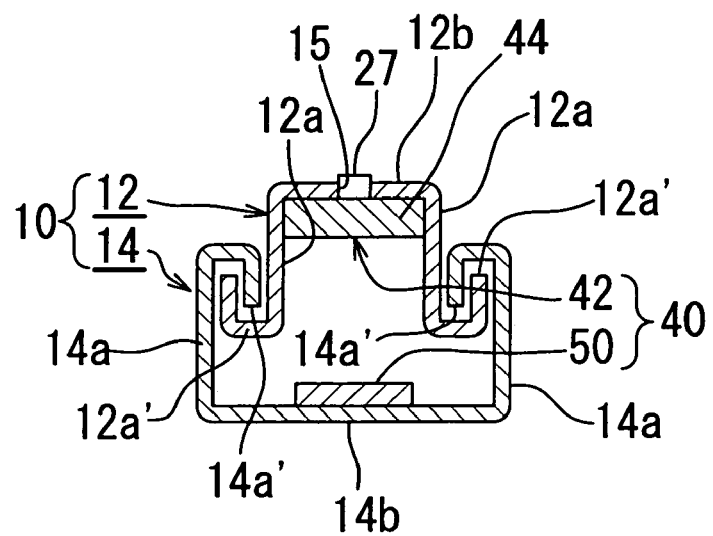
FIG. 11 is a schematic sectional view of the position sensor system shown in FIG. 10.

Referring to FIGS. 10 and 11, there is illustrated a vehicle seat provided with a position sensor system according to a third embodiment of the present invention. The third embodiment is substantially similar to the first embodiment except that a different position sensor system 40 is employed and the magnetic shielding plate is not employed. In FIGS. 10 and 11, components that are substantially similar to those of the seat according to the first embodiment are designated by the same reference numerals. The description of them will not be repeated hereinafter.

The position sensor system 40 according to the third embodiment of the present invention comprises a magnetic sensor 42 electrically connected to the controller through a signal cable (not shown) and mounted to the approximately middle portion of the longitudinal direction of the top plate section 12*b* of the upper rail member 12, and a strip-shaped magnet 50 bonded onto a region of the bottom plate section 14*b* of the lower rail member 14 which is more rear than the approximately middle portion of the longitudinal direction of the bottom plate section 14*b* of the lower rail member 14. The magnetic sensor 42 includes an armor case 44, a Hall element or a Hall integrated circuit (not shown) housed within the armor case 44, a positioning projection 27 projecting upward from an upper surface of the armor case 44 and holes 28, 29 formed in the upper surface of the armor case 44. Like the position sensor unit 22 according to the first embodiment of the present invention, the magnetic sensor 42 is mounted to the top plate section 12*b* of the upper rail member 12 by causing the positioning projection 27 to be fitted in the positioning hole 15 of the upper rail member 12 and causing fastening bolts (not shown) to be screwed through the holes 16, 17 of the upper rail member 12 and screwed into the holes 28, 29 of the armor case 44.

In the third embodiment of the present invention, when the magnetic sensor 42 is withdrawn from the strip-shaped magnet 50, the magnetic sensor 42 generates a first electric signal representative of the seat being in the forward position, and transmits the first signal to the controller. When the magnetic sensor 42 is operatively opposed to the magnet 50 and responds to a magnetic field created by the magnet 50, the magnetic sensor 42 generates a second electric signal representative of the seat being in the rearward position, and transmits the second signal to the controller. The controller controls the passenger restraint device so as to cause the deployment of the passenger restraint device to be expedited, according to the first electric signal, and controls the passenger restraint device so as to cause the deployment of the passenger restraint device to be delayed, according to the second electric signal.

Like the position sensor system 20 according to the first embodiment of the present invention, the position sensor system 40 according to the third embodiment of the present invention is mounted within the inner space defined by the upper rail member 12 and the lower rail member 14. Therefore, the third embodiment can provide the same effects as the first embodiment can do.

Incidentally, while the magnet 50 is arranged at the rearward portion of the bottom plate section 14*b* of the lower rail member 14 in the third embodiment, the magnet 50 may be arranged at the forward portion of the bottom plate section 10*b* of the lower rail member 14. Further, in the third embodiment, the magnet 50 may be mounted with respect to the top plate section 12*b* of the upper rail member 12 and the magnetic sensor 42 may be mounted with respect to the bottom plate section 14*b* of the lower rail member 14.

Figure 12:
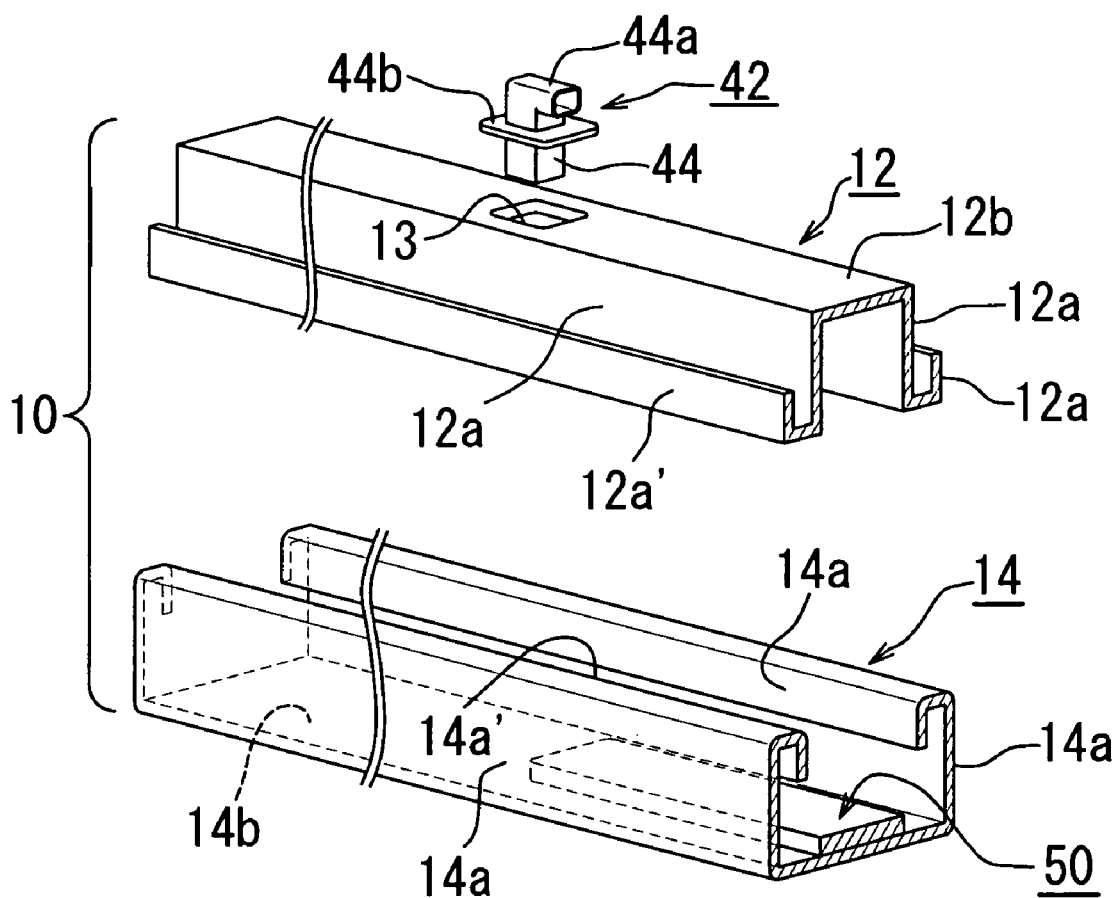
FIG. 12 is a schematic exploded perspective view of assistance in explaining a modification of a construction for mounting a magnetic sensor of FIGS. 10 and 11 to a top plate section of an upper rail member shown in FIGS. 10 and 11.

Referring to FIG. 12, there is illustrated a modification of the construction (shown in FIGS. 10 and 11) for mounting the magnetic sensor 42 with respect to the top plate section 12*b* of the upper rail member 12. In FIG. 12, components that are substantially similar to those of the seat of FIGS. 10 and 11 are designated by the same reference numerals. The description of them will not be repeated hereinafter.

In the modification shown in FIG. 12, the upper rail member 12 has an opening 13 formed in the approximately middle portion of the longitudinal direction of the top plate section 12*b* for receiving the magnetic sensor 42, in lieu of the positioning hole 15 and through-holes 16, 17 which are shown in FIGS. 10 and 11. Further, in the modification, the armor case 44 of the magnetic sensor 42 does not have such a positioning projection 27 and holes 28, 29 as shown in FIGS. 10 and 11. The armor case 44 has a connector section 44*a* provided on the armor case 44 and a circumferential flange portion 44*b* provided around a periphery of the connector section 44*a*. One end of a signal cable (not shown) is connected through the connector section 44*a* to the Hall element or Hall integrated circuit housed within the armor case 44. The other end of the signal cable is connected to the controller.

The magnetic sensor 42 of FIG. 12 can be mounted with respect to the upper rail member 12 from the outside of the upper rail member 12. More particularly, the magnetic sensor 42 is mounted to the top plate section 12*b* of the upper rail member 12 by causing the armor case 44 to be fitted through the opening 13 of the top plate section 12*b* of the upper rail member 12. In the condition where the armor case 44 is fitted through the opening 13 of the top plate section 12*b* of the upper rail member 12, the flange portion 44*b* is supported on the top plate section 12*b* of the upper rail member 12 so as to cover the opening 13 of the top plate section 12*b*.

Figure 13:
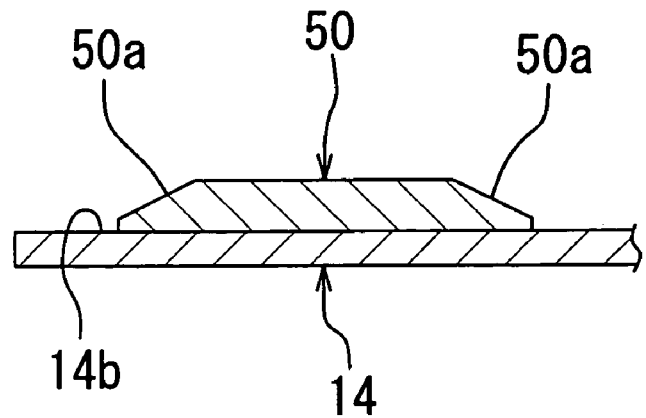
FIG. 13 is a schematic sectional view of a modification of a magnet shown in FIGS. 10–12.

Referring to FIG. 13, the strip-shaped magnet piece 50 may have chamfered upper edge portions 50*a* extending along a longitudinal direction of the magnet piece 50 and sloping downward. Such a construction allows the magnet piece 50 to be prevented from being damaged by any foreign substances that may accidentally enter the lower rail member 14 from the forward and/or rearward direction of the lower rail member 14, because the magnet piece 50 does not have longitudinal corner edges and the foreign substances will not be stopped against the magnet piece 50 and will be slipped along the chamfered upper edge portions 50*a*.

Figure 14:
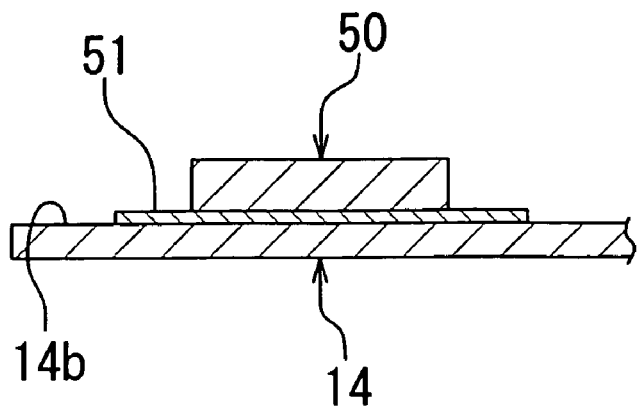
FIG. 14 is a schematic sectional view of the magnet of FIGS. 10–12, in which the magnet is mounted on a bottom plate of a lower rail member through an iron plate serving as a yoke.

Referring to FIG. 14, the magnet piece 50 of FIGS. 10–13 may be mounted to the bottom plate section 14*b* of the lower rail member 14 through an iron plate piece 51 serving as a yoke. Such a construction allows a magnetic flux from the magnet piece 50 to be focused by the iron plate piece 51, so that the magnetic field produced by the magnet piece 50 can be efficiently sensed by the magnetic sensor 42.

Figure 15:
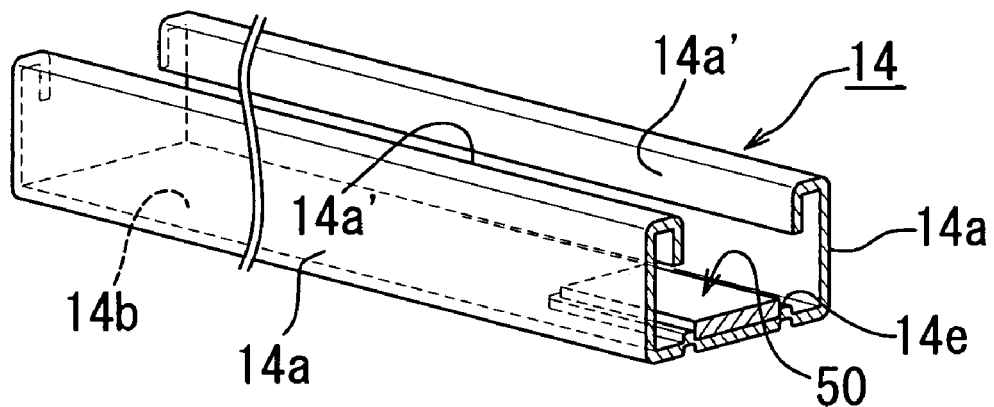
FIGS. 15–29 are each a schematic view of assistance in explaining a construction for mounting the magnet of FIGS. 10–12 on the bottom plate section of the lower rail member.
Figure 16:
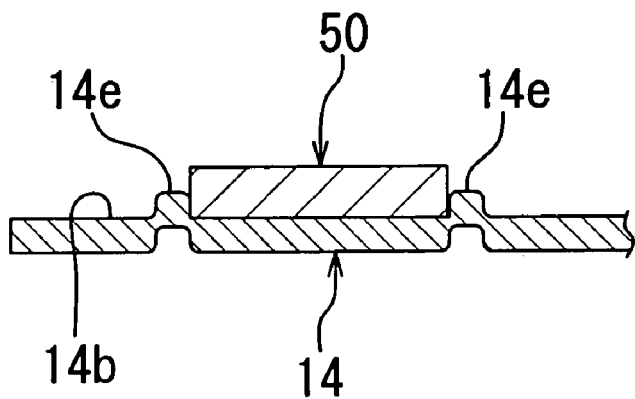

Referring to FIGS. 15 and 16, there is illustrated a construction for mounting the magnet piece 50 of FIGS. 10–13 to the bottom plate section 14*b* of the lower rail member 14. In this construction, the bottom plate section 14*b* of the lower rail member 14 is provided with a frame portion 14*e* rising up from an inner surface of the bottom plate section 14*b*. The magnet piece 50 is fitted in the frame portion 14*e*, positioned by the frame portion 14*e*, and adhesive-bonded onto the bottom plate section 14*b*. The frame portion 14e is formed by causing a portion of the bottom plate section 14b to be protruded inwardly from an outer surface of the bottom plate section 14b.

Figure 17:
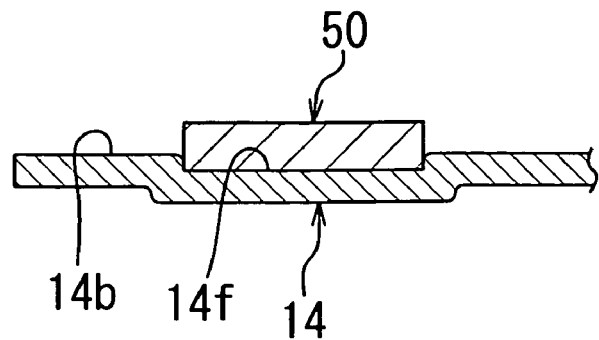

Referring to FIG. 17, there is illustrated a first modification of the construction (shown in FIGS. 15 and 16) for mounting the magnet piece 50 to the bottom plate section 14b of the lower rail member 14. In this modification, the bottom plate section 14b of the lower rail member 14 has a recessed portion 14f. The magnet piece 50 is mounted within and bonded to the recessed portion 14f.

Figure 18:
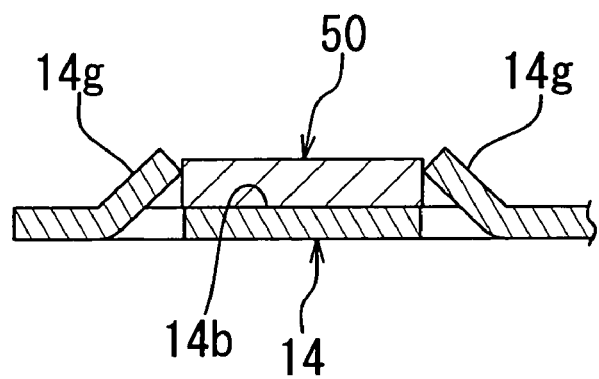

Referring to FIG. 18, there is illustrated a second modification of the construction (shown in FIGS. 15 and 16) for mounting the magnet piece 50 to the bottom plate section 14b of the lower rail member 14. In the modification, the bottom plate section 14b of the lower rail member 14 is provided with a pair of spaced apart rising pieces 14g extending along the longitudinal direction of the bottom plate section 14b. The rising pieces 14g are formed by causing portions of the bottom plate section 14b to be cut and causing the portions to obliquely rise up inwardly. The magnet piece 50 is interposed between the rising pieces 14g and retained by the rising pieces 14g.

Figure 19:
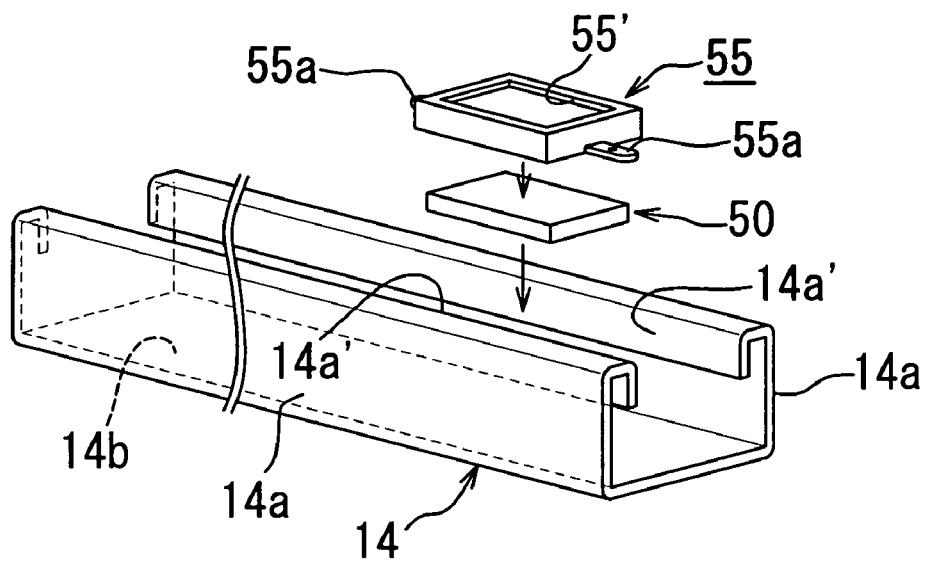
Figure 20:
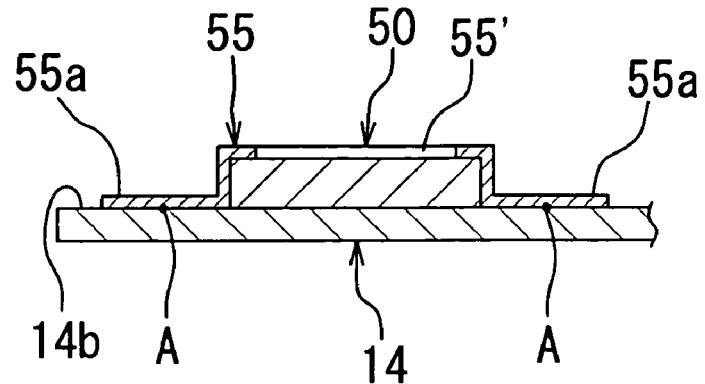

Referring to FIGS. 19 and 20, there is illustrated a third modification of the construction (shown in FIGS. 15 and 16) for mounting the magnet piece 50 to the bottom plate section 14b of the lower rail member 14. In this modification, a substantially rectangular frame-shaped case 55 for housing the magnet piece 50, which is formed independently from the lower rail member 14, is employed. The case 55 is made of material selected from the group consisting of iron, aluminum, copper, stainless steel, and resin. The case 55 has an opening 55' and a pair of spaced apart mounting pieces 55a projecting from front and rear sides thereof The case 55 is mounted on the bottom plate section 14b of the lower rail member 14 by causing the mounting pieces 55a to be secured to the bottom plate section 14b. The magnet piece 50 is housed within the case 55 and exposed to the outside through the opening 55'.

In a case where the case 55 is made of iron, the case 55 may be mounted on the bottom plate section 14b of the lower rail member 14 by causing the mounting pieces 55a of the case 55 to be spot-welded to the bottom plate section 14b of the lower rail member 14 as at A in FIG. 20.

Figure 21:
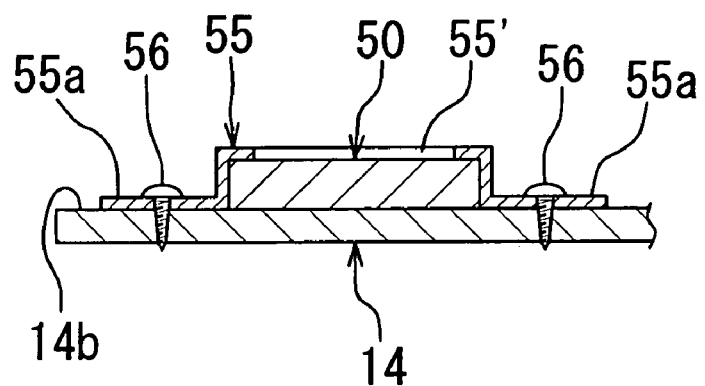

As shown in FIG. 21, the case 55 may be mounted to the bottom plate section 14b of the lower rail member 14 by causing the mounting pieces 55a of the case 55 to be secured to the bottom plate section 14b of the lower rail member 14 by tapping screws 56.

Figure 22:
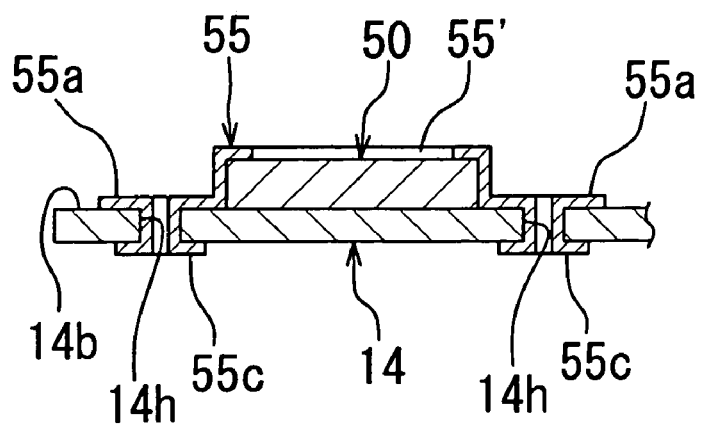

In a case where the case 55 is formed of material selected from the group consisting of iron, aluminum, copper and stainless steel, the case 55 may have tube-shaped retaining rings 55c provided at the mounting pieces 55a as shown in FIG. 22. In connection with this, the bottom plate section 14b of the lower rail member 14 has a pair of spaced apart through-holes 14h. The case 55 is mounted on the bottom plate section 14b of the lower rail member 14 by causing the tube-shaped retaining rings 55c to be inserted through the through-holes 14h and causing ends of the tube-shaped retaining rings 55c to be riveted over the outer surface of the bottom plate section 14b.

Figure 23:
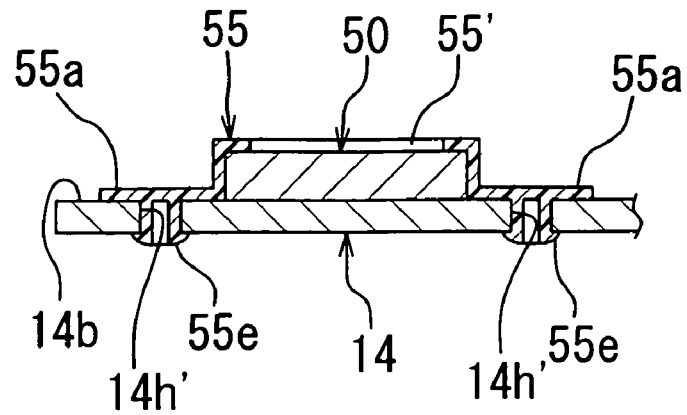

In a case where the case 55 is made of resin, the case 55 may have anchor clips 55e provided at the mounting pieces 55a as shown in FIG. 23. In connection with this, the bottom plate section 14b of the lower rail member 14 has a pair of spaced apart through-holes 14h'. The case 55 is mounted on the bottom plate section 14b of the lower rail member 14 by causing the anchor clips 55e to be fitted through the through-holes 14h'.

Figure 24:
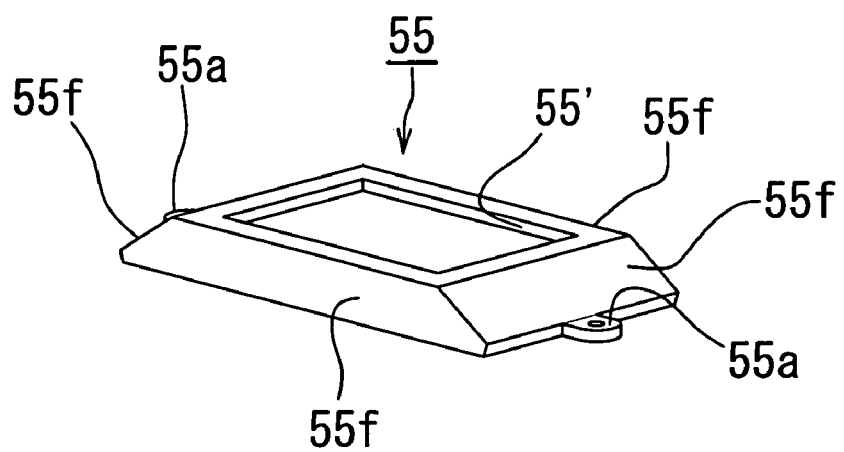
Figure 25:
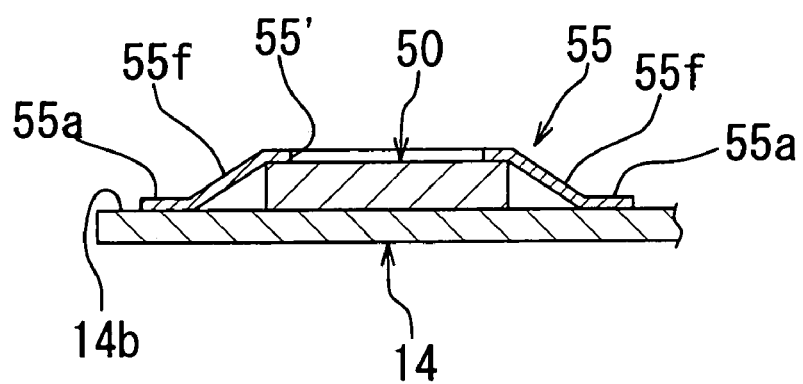

Referring to FIGS. 24 and 25, the case 55 may have a body of a substantially quadrangular, truncated pyramid shape in outline that comprises four downward slope surfaces 55f. This allows the case 55 to be prevented from being removed from the bottom plate section 14b of the lower rail member 14 by any foreign substances that may accidentally enter the lower rail member 14 from the forward and/or rearward direction of the lower rail member 14, because the foreign substances will not be stopped against the case 55 and will be slipped along the downward slope surfaces 55f.

Figure 26:
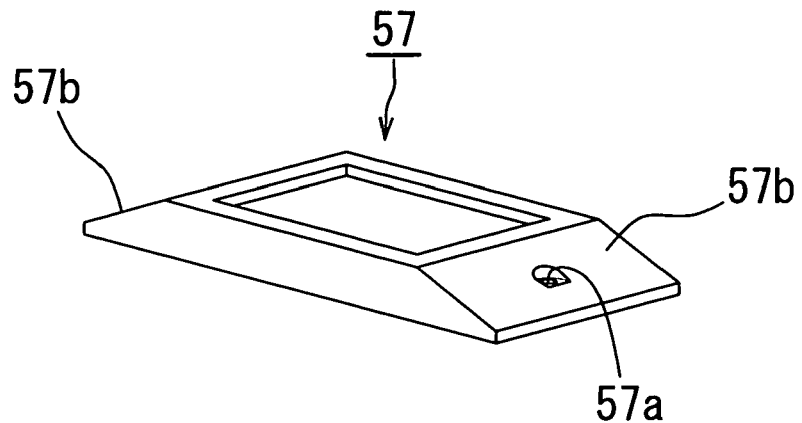
Figure 27:
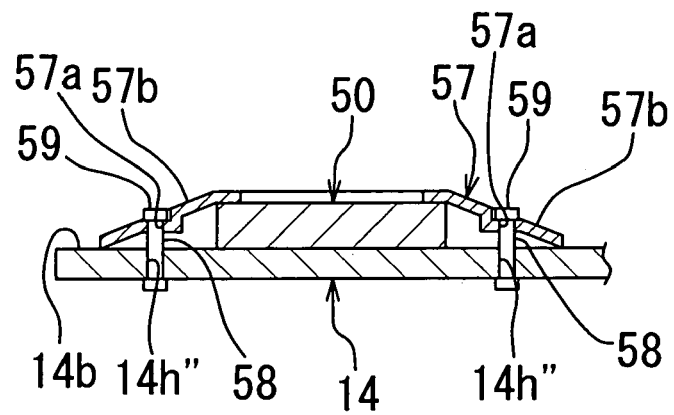

Referring to FIGS. 26 and 27, there is illustrated a modification 57 of the case 55 shown in FIGS. 24 and 25. The case 57 of FIGS. 26 and 27 is substantially similar to the case 55 of FIGS. 24 and 25 except that the case 57 has mounting through-holes 57a which formed in front and rear side downward slope surfaces 57b, in lieu of the mounting pieces 55a which are shown in FIGS. 24 and 25. In connection with this, the bottom plate section 14b of the lower rail member 14 has a pair of spaced apart through-holes 14h". The case 57 is mounted on the bottom plate section 14b of the lower rail member 14 by causing bolts 58 to be inserted through the through-holes 57a of the case 57 and the tough-holes 14h" of the lower rail member 14, and tightening nuts 59 on the bolts 58.

Figure 28:
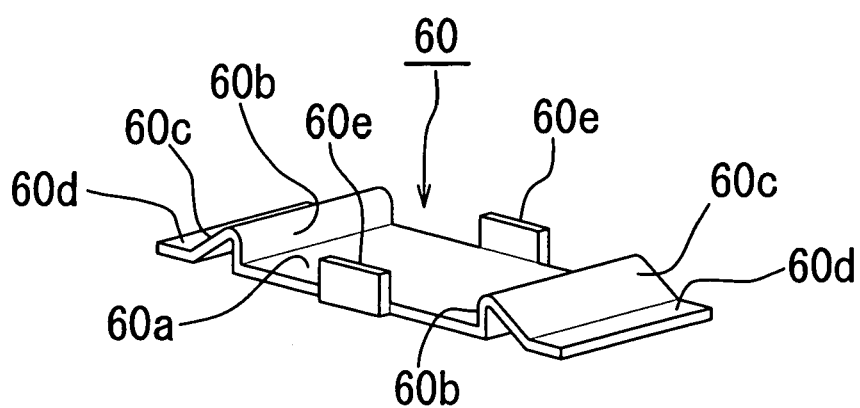
Figure 29:
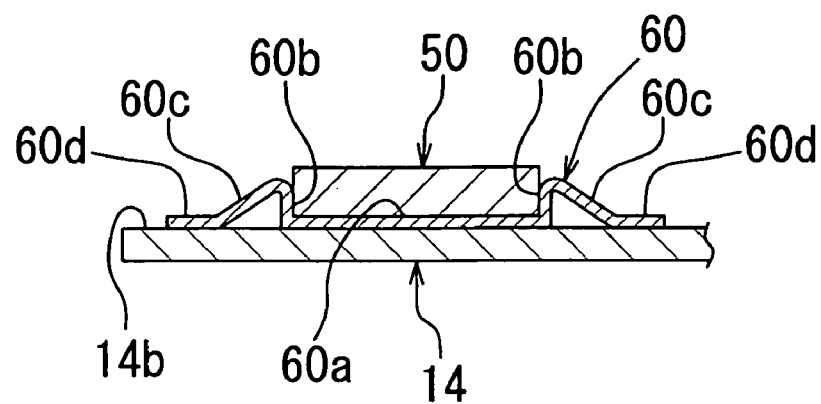

Referring to FIGS. 28 and 29, there is illustrated a fourth modification of the construction (shown in FIGS. 15 and 16) for mounting the magnet piece 50 with respect to the bottom plate section 14b of the lower rail member 14. In this modification, the magnet piece 50 is held by a case 60 that is different from the case 55 of FIGS. 19–25 and the case 57 of FIGS. 26 and 27. The case 60 comprises a base plate 60a on which the magnet piece 50 is carried, rising portions 60b rising up from front and rear sides of the base plate 60a, slope portions 60c extending from upper ends of the rising portions 60b and obliquely sloping down, mounting pieces 60d extending horizontally from lower ends of the slope portions 60c, and engaging pieces 60e provided at both sides of the base plate 60a so as to rise up from the both sides of the base plate 60a. The magnet piece 50 is carried on the base plate 60a and retained or held by the rising portions 60b and the engaging pieces 60e. The case 60 is mounted on the bottom plate section 14b of the lower rail member 14 by causing the mounting pieces 60d to be secured to the bottom plate section 14b of the lower rail member 14 by any suitable means.

Figure 30:
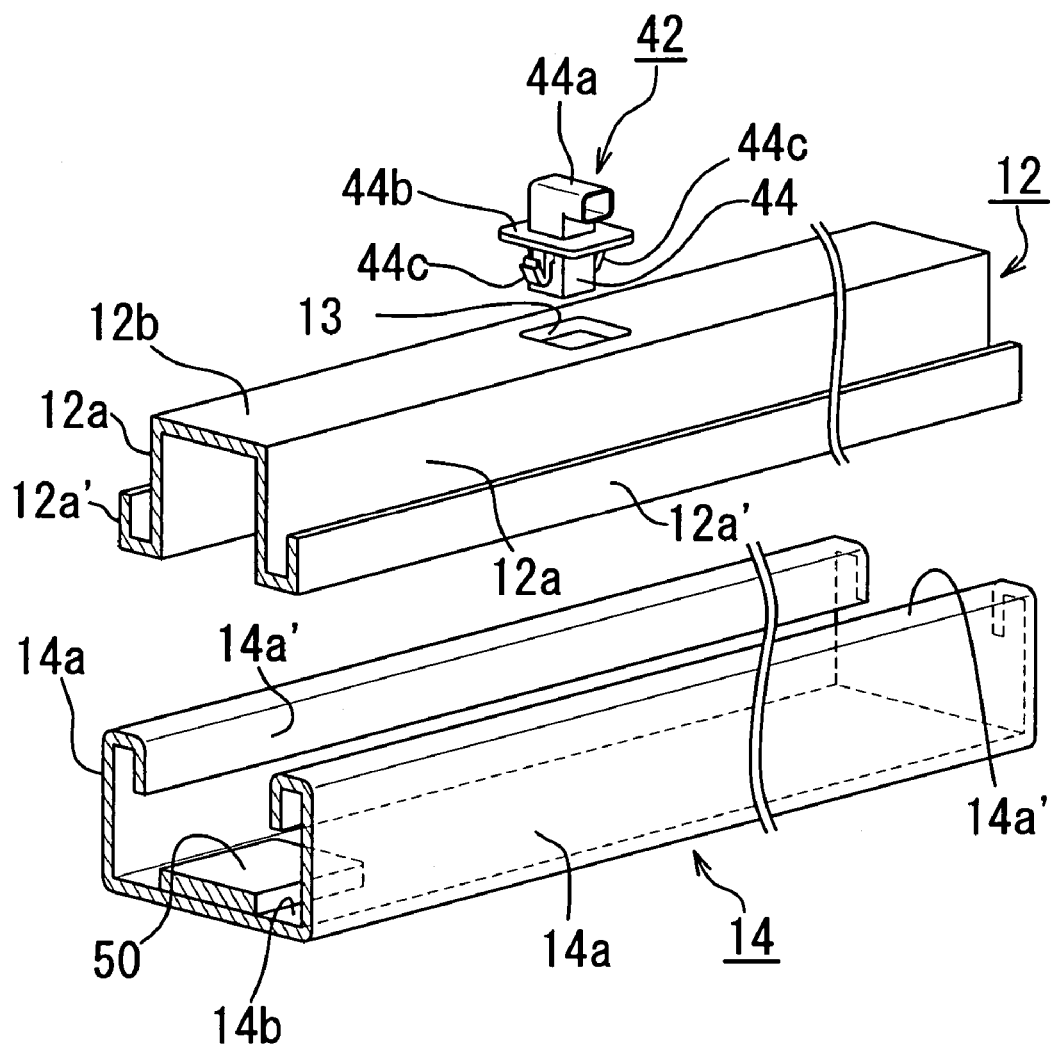
FIG. 30 is a schematic exploded perspective view of assistance in explaining a modification of a construction of FIG. 12 for mounting the magnetic sensor to the top plate section of the upper rail member.
Figure 31:
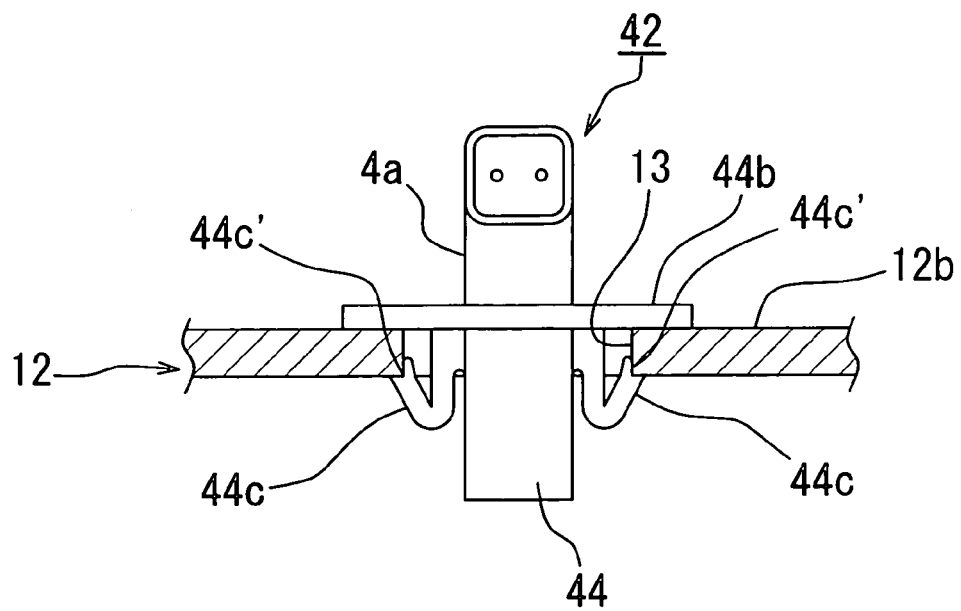
FIG. 31 is a schematic partially sectional view of the modification shown in FIG. 30.

Referring to FIGS. 30 and 31, there is illustrated a modification of the construction (shown in FIG. 12) for mounting the magnetic sensor 42 with respect to the top plate section 12b of the upper rail member 12. In FIGS. 30 and 31, components that are substantially similar to those of the example shown in FIG. 12 are denoted by the same reference numerals. The description of them will not be repeated hereinafter. In this modification, the armor case 44 of the magnetic sensor 42 has a pair of spaced apart spring clips 44c provided at both sides of the armor case 44 and extending downwardly from the flange portion 44b, each of the spring clips 44c being of a substantially U-shape. The spring clips 44c have step portions 44c' provided at free ends thereof. The step portions 44c' are formed by causing the free ends of the spring clips 44c to be cut out. The magnetic sensor 42 is mounted to the top plate section 12b of the upper rail member 12 with the armor case 44 being fitted through the opening 13 of the upper rail member 12, with the step portions 44c' of the spring clips 44c being engaged with an edge of the opening 13, and with the flange portion 44b being pressed down against the top plate section 12b of the upper rail member 12 due to actions of the spring clips 44c.

Figure 32:
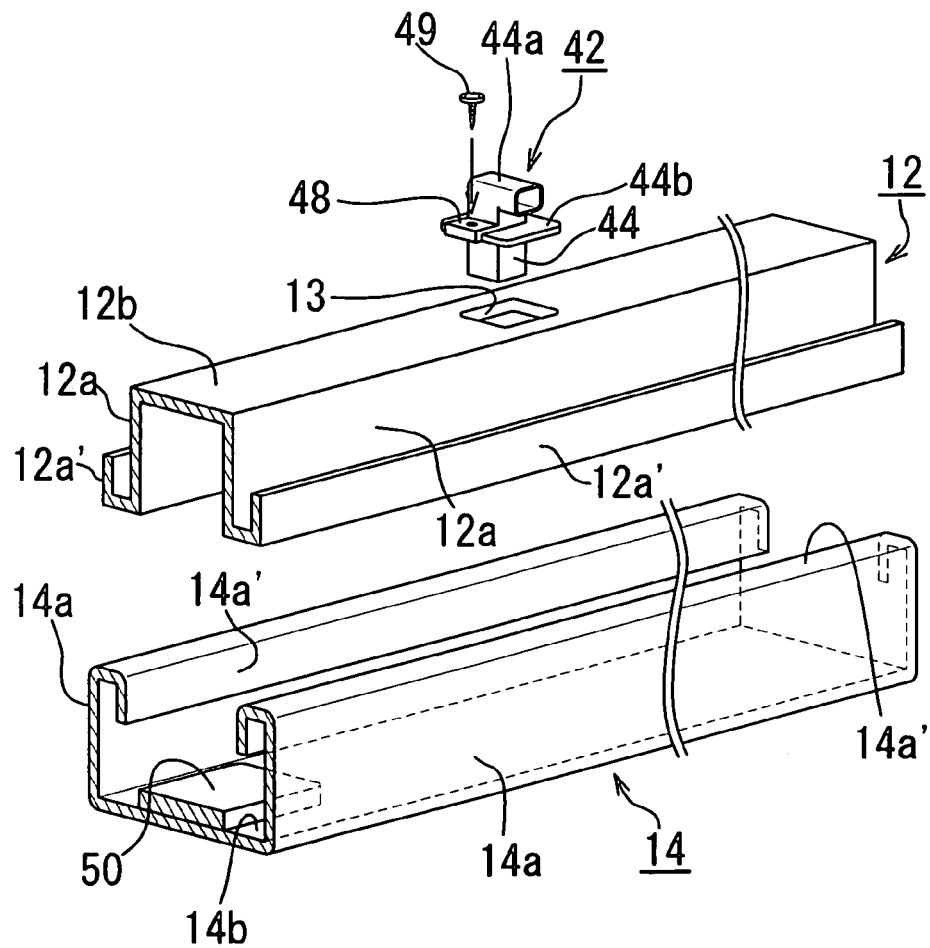
FIG. 32 is a schematic exploded perspective view of assistance in explaining another modification of the construction of FIG. 12 for mounting the magnetic sensor to the top plate section of the upper rail member.
Figure 33:
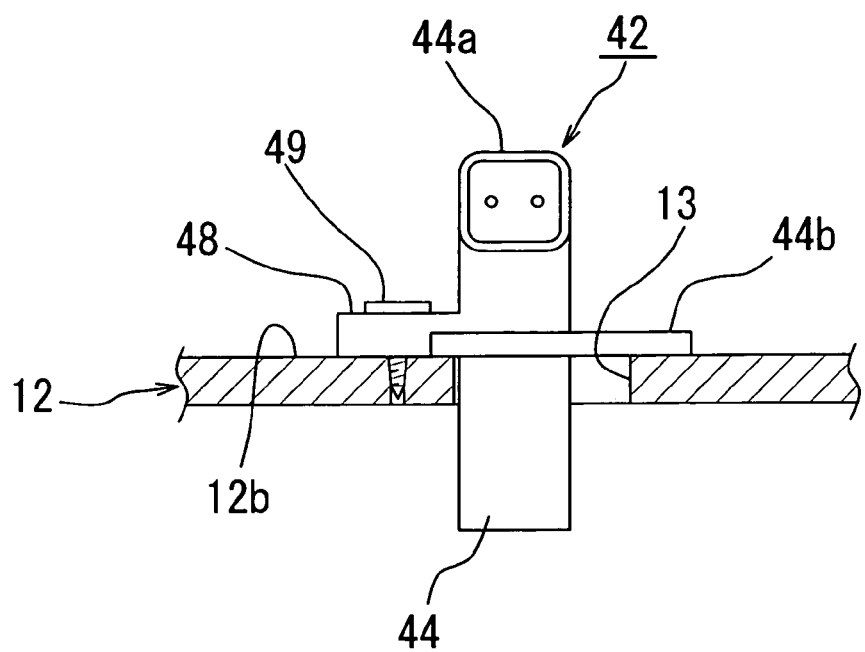
FIG. 33 is a schematic partially sectional view of the modification shown in FIG. 32.

Referring to FIGS. 32 and 33, there is illustrated another modification of the construction (shown in FIG. 12) for mounting the magnetic sensor 42 with respect to the top plate section 12b of the upper rail member 12. In FIGS. 32 and 33, components that are substantially similar to those of the example shown in FIG. 12 are denoted by the same reference numerals. In this modification, the flange portion 44b is provided with an applying piece 48 that protrudes laterally from the flange portion 44b. The magnetic sensor 42 is mounted with respect to the top plate section 12b of the upper rail member 12 with the armor case 44 being inserted through the opening 13 of the top plate section 12b, with the flange portion 44b being seated on the top plate section 12c, and with the applying piece 48 being secured on the top plate section 12b by means of a tapping screw 49.

Figure 34:
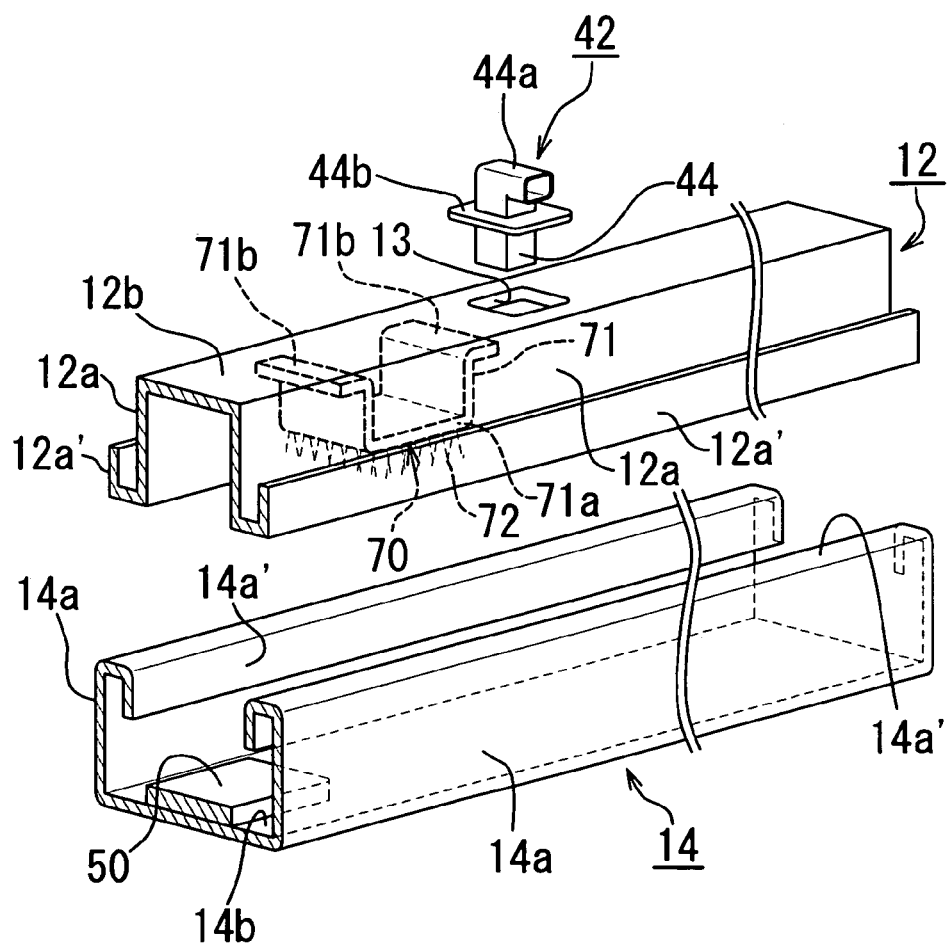
FIG. 34 is a schematic exploded perspective view of a position sensor system according to a fourth embodiment of the present invention.
Figure 35:
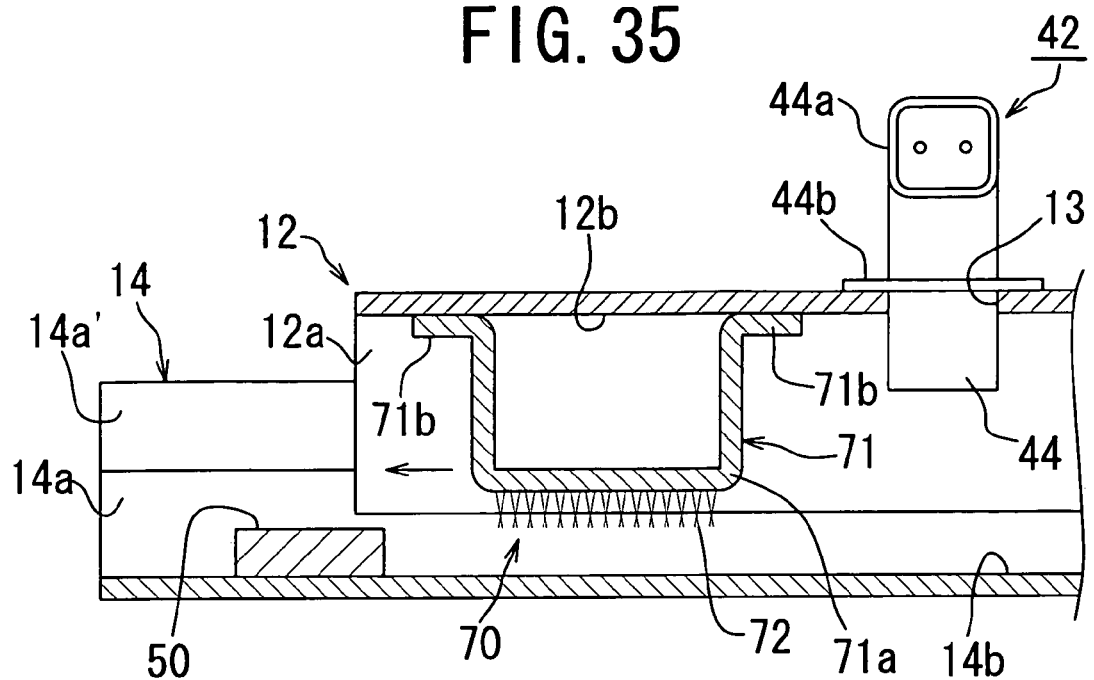
FIG. 35 is a schematic sectional view of the position sensor system of FIG. 34.

Referring to FIGS. 34 and 35, there is illustrated a vehicle seat provided with a position sensor system according to a fourth embodiment of the present invention. The fourth embodiment is substantially similar to the example of FIG. 12 except that cleaner means 70 for cleaning the magnet 50 is employed. In FIGS. 34 and 35, components that are substantially similar to those of the embodiment shown in FIG. 12 are denoted by the same reference numerals. The description of them will not be repeated hereinafter.

The cleaner means 70 comprises a body 71 of a substantially inverted symbol-of-ohm shape, and cleaner piles 72. The body 71 comprises a substantially U-shape central section 71a and an inverted L-shape portion 71b extending from each of both sides of the U-shape central section 71a. The cleaner piles 72 are studded over an outer surface of a bottom portion of the U-shape central section 71a. The cleaning means 70 is mounted to an inner surface of the top plate section 12b with the cleaner piles 72 facing downwardly, and is arranged behind the magnetic sensor 42 which is mounted to the top plate section 12b. As the seat is moved along the lower rail members 14 and the cleaning means 70 approaches the magnet 50, the magnet 50 can be cleaned by the cleaner piles 72.

Like the position sensor systems according to the above-mentioned embodiments of the present invention, the position sensor system according to the fourth embodiment of the present invention is mounted within the inner space defined by the upper rail member 12 and the lower rail member 14. Therefore, the fourth embodiment can provide the same effects as the above-mentioned embodiments can do.

Figure 36:
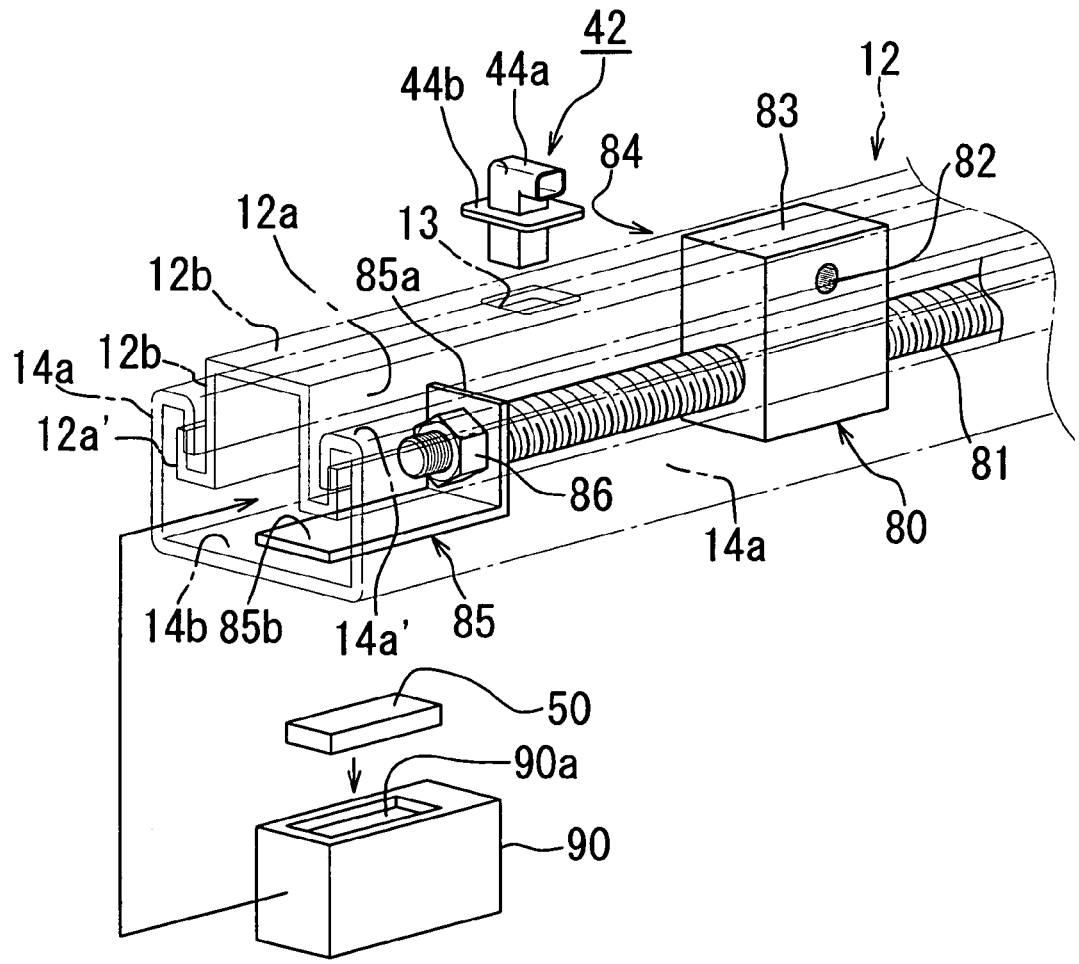
FIG. 36 is a schematic exploded perspective view of a position sensor system according to a fifth embodiment of the present invention.

Referring to FIG. 36, there is illustrated a vehicle seat provided with a position sensor system according to a fifth embodiment of the present invention. The fifth embodiment is substantially similar to the example of FIG. 12 except that driving means 80 for automatically moving the seat along the lower rail members 14 is employed and the magnet 50 is received in and supported by a box-like holder 90. In FIG. 36, components that are substantially similar to those of the example shown in FIG. 12 are designated by the same reference numerals. The description of them will not be repeated hereinafter.

The driving means 80 for automatically moving the seat along the lower rail members 14 is mounted within each of the pair of the slide rail means. The driving means 80 includes a lead screw 81 extending along the longitudinal direction of the lower rail member 14, first gear means 82 meshed with the lead screw 81 so as to be movable relative to the lead screw 81, and a gear box 83 housing the first gear means 82 therein and mounted to an inner surface of the top plate section 12b of the upper rail member 12. A driving motor 84 (indicated in FIG. 36 by an arrow) is coupled through second gears means (not shown) to the first gear means 82 of the driving means 80 mounted within the pair of the slide rail means, so that the first gear means 82 are adapted to be moved along the lead screws 81 by the driving motor 84, whereby the seat can be moved along the lower rail members 14.

The lead screw 81 is spaced apart from the bottom plate section 14b of the lower rail member 14 and supported at both end portions thereof (only one end portion of the lead screw 81 is shown in FIG. 36) to substantially L-shaped bracket plates 85 which are mounted to the bottom plate section 14b of the lower rail member 14 (only one bracket plate 85 is shown in FIG. 36). Each of the substantially L-shaped bracket plates 85 comprises a vertical section 85a and a horizontal section 85b. The both end portions of the lead screw 81 penetrate the vertical sections 85a and fastened to the vertical sections 85a by nuts 86 (only one nut 86 is shown in FIG. 36). The horizontal sections 85b are secured to the bottom plate section 14b of the lower rail member 14 by any suitable means.

The holder 90 for supporting the magnet 50 is mounted on a horizontal section 85b of a bracket plate 85 secured to a portion of the bottom plate section 14b of the lower rail member 14 which is more rear than the approximately middle portion of the longitudinal direction of the lower rail member 14. The holder 90 has a first recess 90a provided at an upper portion thereof, in which the magnet 50 is received. The magnet 50 received in the recess portion 90a is bonded to the holder 90.

Figure 37:
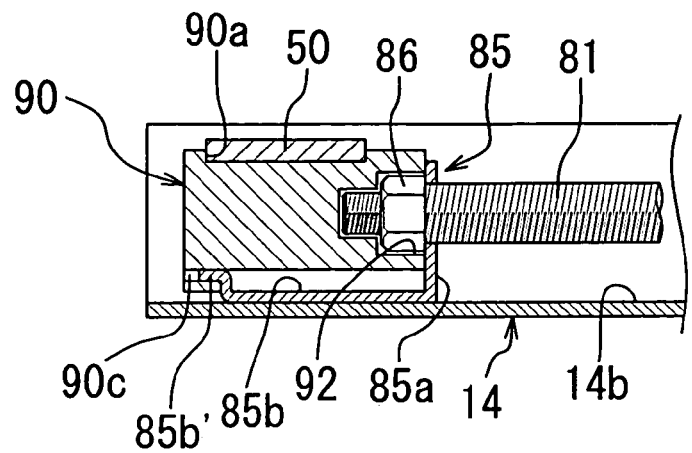
FIG. 37 is a schematic sectional view of a construction for mounting of a magnet holder employed in the position sensor system of FIG. 36.
Figure 38:
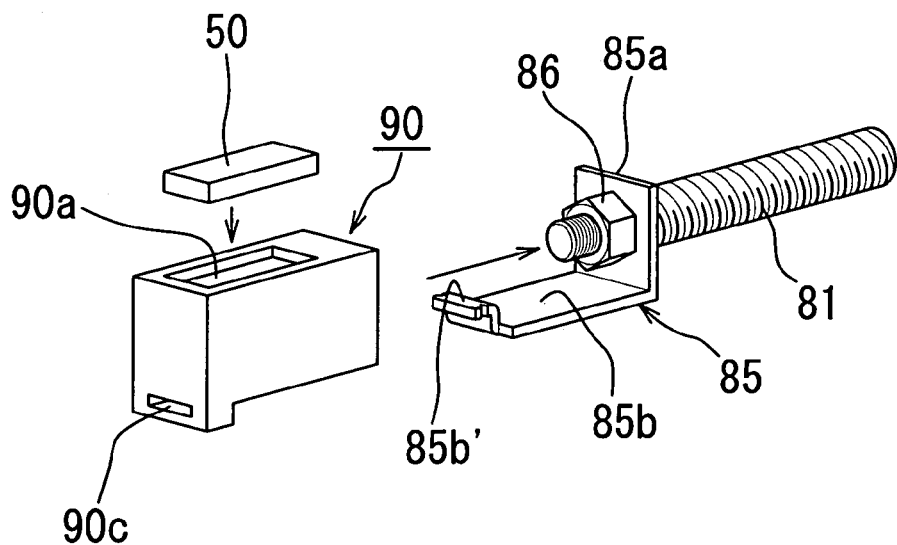
FIG. 38 is a schematic exploded perspective view of assistance in explaining the construction shown in FIG. 37.

Referring to FIGS. 37 and 38, the holder 90 may be provided with a second recess 92 at a front side thereof. The horizontal portion 85b of the bracket plate 85 on which the holder 90 is arranged may provided with an engaging piece 85b' of an inverted L-shape which extends upwardly from the horizontal section 85b of the bracket plate 85. In connection with this, the holder 90 has a horizontally extending slit 90c formed in a lower portion thereof. The holder 90 is mounted on the horizontal portion 85b of the bracket 85 with the second recess 92 receiving the end portion of the lead screw 81 including a nut 86 mounted thereon and with the slit 90c receiving the engaging piece 85' of the bracket plate 85, whereby the holder 90 can be stably mounted to the bracket plate 85.

Figure 39:
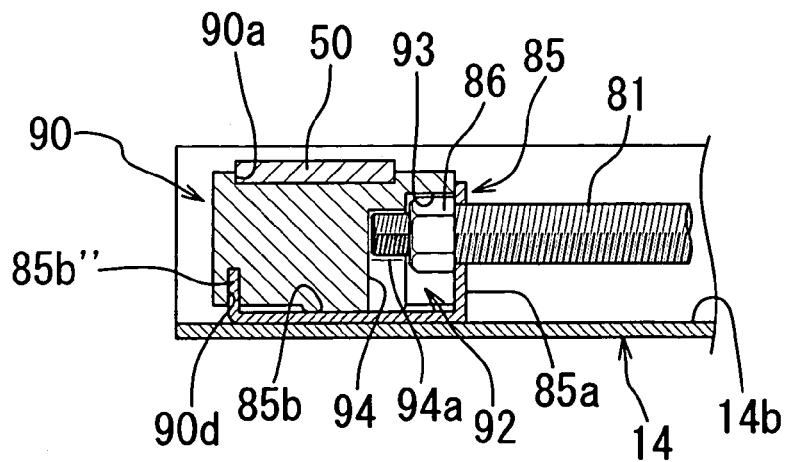
FIGS. 39–41 are each a schematic view of assistance in explaining a modification of the construction shown in FIGS. 37 and 38.
Figure 40:
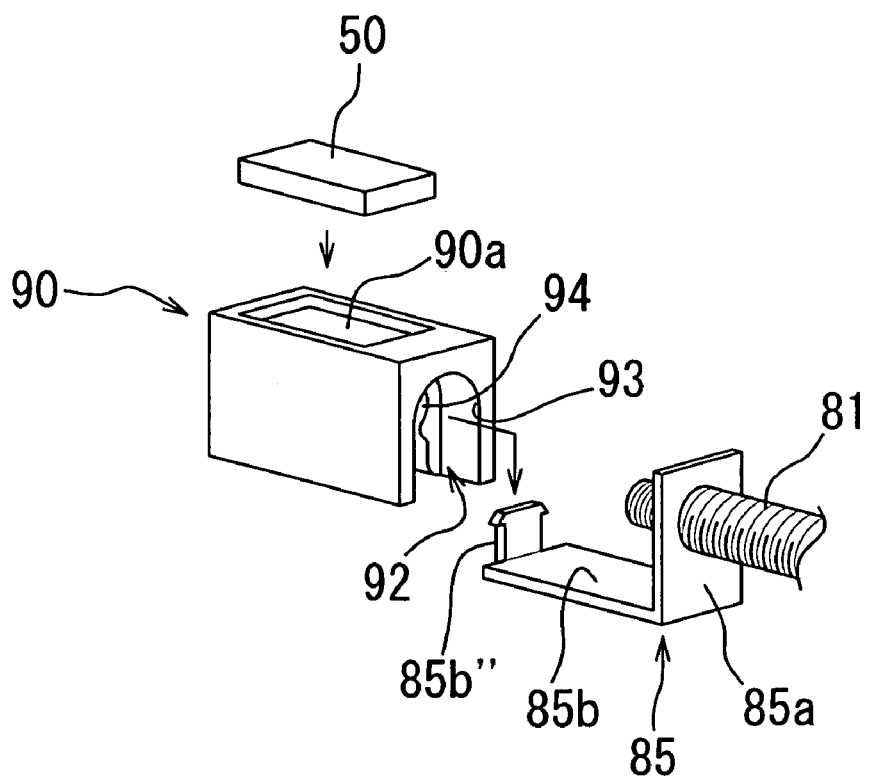

Referring to FIGS. 39 and 40, the horizontal section 85b of the bracket plate 85 on which the holder 90 is mounted may be provided with an engaging piece 85b'' which extends straightly and upwardly from the horizontal section 85, in lieu of the substantially L-shaped engaging piece 85b' of FIGS. 37 and 38. In connection with this, the holder 90 has a slit 90d extending upward from a lower surface of the holder 90, in lieu of the slit 90c of FIGS. 37 and 38. The second recess 92 of the holder 90 may comprise a first recess portion 93 of a substantially arc-shape which is allowed to receive the nut 86 on the end portion of the lead screw 81, and a second recess portion 94 at the back of the first recess portion 92, in which the end portion of the lead screw 81 is received.

Figure 41:
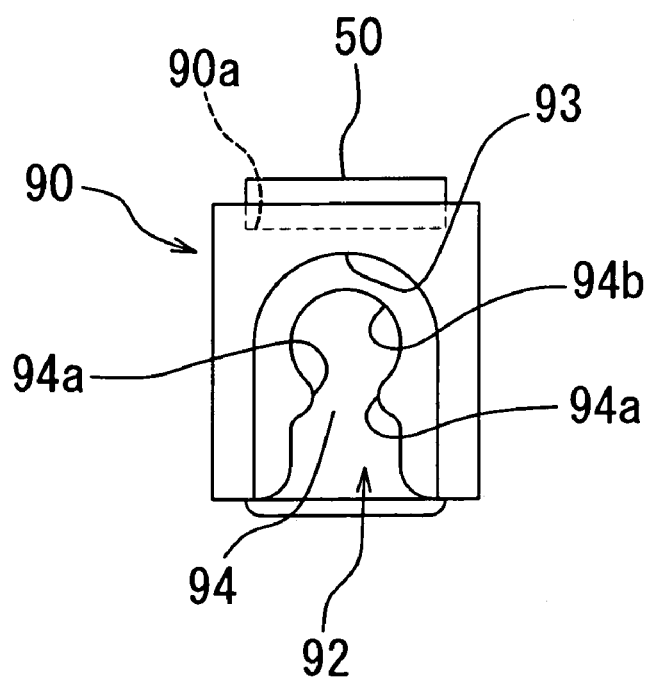

Referring to FIG. 41, the second recess portion 94 of the second recess 92 of the holder 90 comprises a pair of inwardly projecting portions 94a spaced apart from and opposed to each other, and a circular portion 94b having a diameter slightly larger than that of the lead screw 81. In this instance, the mounting of the holder 90 with respect to the horizontal section 85b of the bracket plate 85 is carried out by causing the engaging piece 85b″ of the bracket plate 85 to be inserted in the slit 90d of the holder 90, and causing the end portion of the lead screw 81 to be press-fitted into the circular portion 94b through a space between the spaced apart projecting portions 94a while causing the nut 86 on the end portion of the lead screw 81 to be received in the first recess portion 93. In a condition where the holder 90 is mounted with respect to the bracket plate 85, the end of portion of the lead screw 81 that is received in the circular portion 94b of the holder 90 is stably supported by the pair of the projecting portions 94a.

Figure 42:
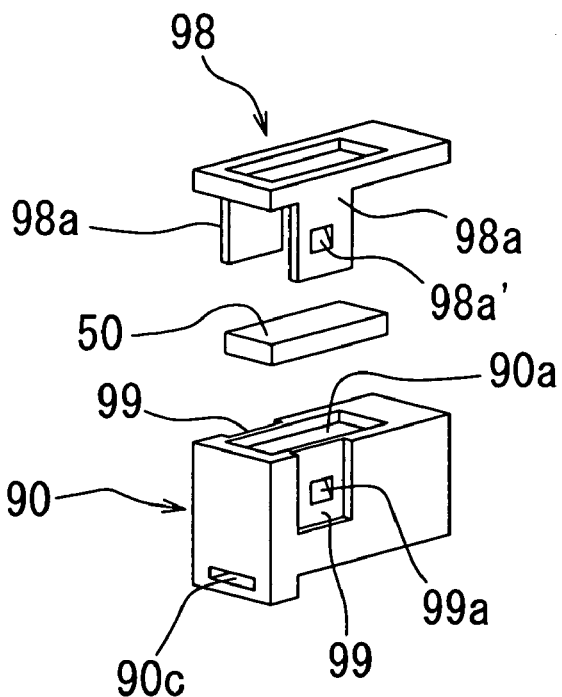
FIG. 42 is a schematic perspective view of the magnet holder, the magnet and a frame-shaped hold-down plate, in which the magnet is adapted to be pressed into a first recess of the magnet holder by means of the hold-down plate.

Referring to FIG. 42, the magnet 50 received in the first recess 90a may be pressed into the first recess 90a by a frame-shaped hold-down plate 98. The frame-shaped hold-down plate 98 has a pair of spaced apart snap leg portion 98a hanging from the hold-down plate 98. The snap leg portions 98a are provided with engaging pawls 98a′ which are formed by causing regions of the snap leg portions 98a to be cut and causing the regions of the snap leg portions 98a to be raised relative to surfaces of the snap leg portions 98a. In connection with this, the holder 90 is provided with a pair of third spaced apart recesses 99 with which the snap leg portions 98a of the hold-down plate 98 are engaged. The third recesses 99 of the holder 90 are provided with engaging grooves 99a (only one groove 99a is shown in FIG. 42) with which the engaging pawls 98a′ of the hold-down plate 98 are engaged. The magnet 50 received in the first recess 90a of the holder 90 is pressed into the first recess 90a of the holder 90 by causing the snap leg portions 98a′ to be engaged with the third recesses 99, and causing the engaging pawls 98a′ to be engaged with the grooves 99a of the holder 90.

Like the position sensor system according to the above-mentioned embodiments of the present invention, the position sensor system according to the fifth embodiment of the present invention is mounted within the inner space defined by the upper rail member 12 and the lower rail member 14. Therefore, the fifth embodiment can provide the same effects as the above-mentioned embodiments can do.

Figure 43:
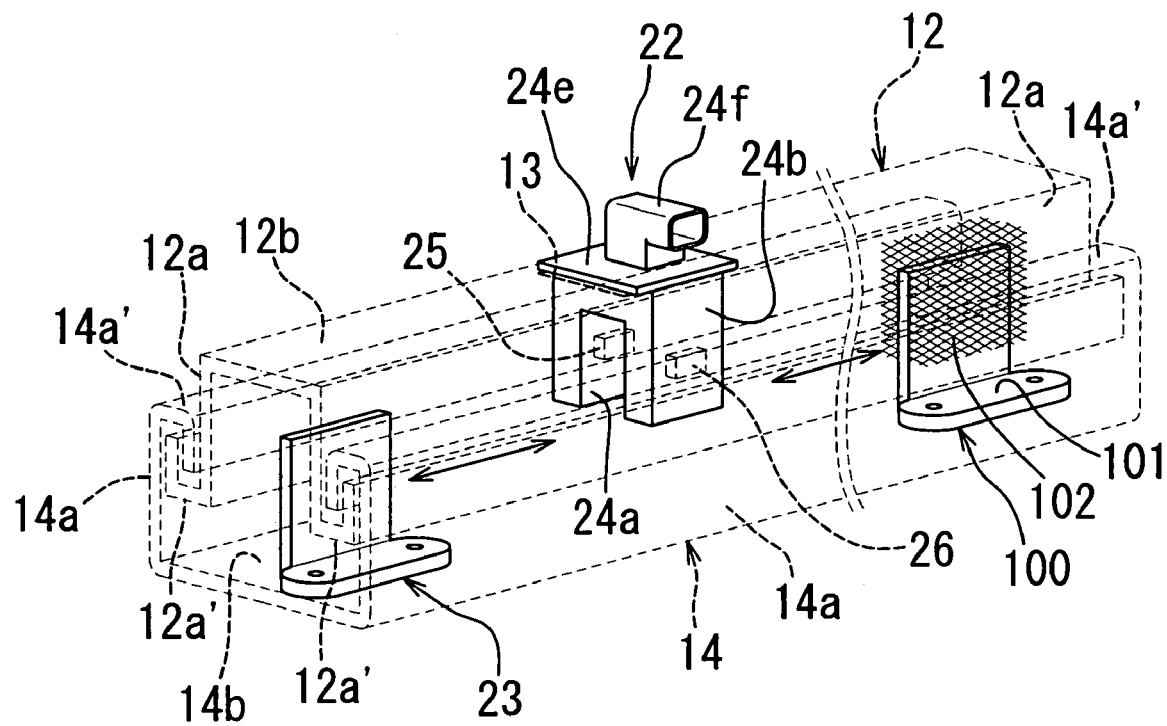
FIG. 43 is a schematic perspective view of assistance in explaining a position sensor system according to a sixth embodiment of the present invention.
Figure 44:
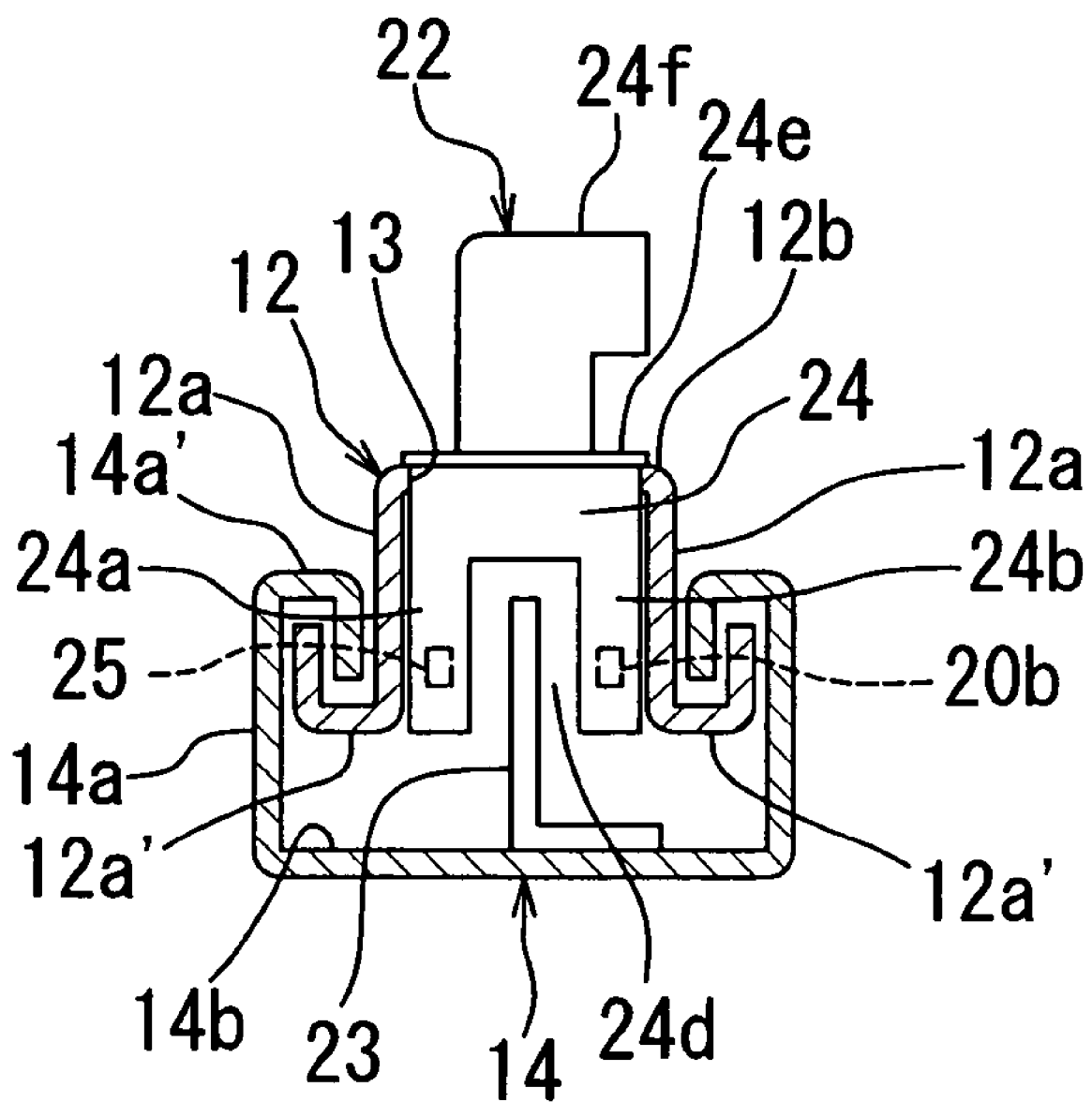
FIG. 44 is a schematic sectional view of the position sensor system shown in FIG. 43.

Referring to FIGS. 43 and 44, there is illustrated a vehicle seat provided with a position sensor system according to a sixth embodiment of the present invention. The sixth embodiment of the present invention is substantially similar to the first embodiment of FIG. 4 except that a different construction for mounting the sensor unit 22 with respect to the top plate section 12c of the upper rail member 12 is employed, and cleaner means 100 for cleaning the magnetic actuator 25 and the magnetic field-responding element 26 of the position sensor unit 22 is employed. In FIGS. 43 and 44, components that are substantially similar to those of the first embodiment shown in FIG. 4 are denoted by the same reference numerals. The description of them will not be repeated hereinafter.

The top plate section 12b of the upper rail member 12 has an opening 13 formed in the approximately middle portion of the longitudinal direction of the top plate section 12b, in lieu of the positioning hole 15 and the through-holes 16, 17 which are shown in FIG. 4. The position sensor unit 22 does not have such a positioning projection 27 and holes 28, 29 as shown in FIG. 4, and has a connector section 24f provided on the housing 24 and a circumferential flange portion 24e provided around the connector section 24f. One end of a signal cable (not shown) is connected to the magnetic field-responding element 26 through the connector section 24f and the other end of the signal cable is connected to the controller. The position sensor unit 22 is mounted with respect to the top plate section 12b of the upper rail member 12 with the housing 24 being fitted through the opening 13 of the top plate section 12b, and with the flange portion 24e being supported on the top plate section 12b so as to cover the opening 13 of the top plate section 12b.

The cleaner means 100 for cleaning the magnetic actuator 25 and the magnetic field-responding element 26 of the sensor unit 22 is arranged on a forward portion of the bottom plate section 14b of the lower rail member 14 and aligned with the magnetic shielding plate 23. The cleaner means 100 comprises a base plate 101 of a substantially L-shape mounted on the bottom plate section 14b of the lower rail member 14, and cleaner piles 102 studded over a vertical portion of the substantially L-shaped base plate 101. When the sensor unit 22 is moved as the seat is moved forward along the lower rail members 14, the cleaner means 100 is received in the space 24d between the magnetic actuator 25 and the magnetic field-responding element 26, whereby the magnetic actuator 25 and the magnetic field-responding element 26 can be cleaned by the cleaner piles 102 as the seat is moved. In lieu of the cleaner means 100, cleaner piles may be studded over the vertical portion of the substantially L-shaped magnetic shielding plate 23.

Like the position sensor system according to the above-mentioned embodiments of the present invention, the position sensor system according to the sixth embodiment of the present invention is mounted within the inner space defined by the upper rail member 12 and the lower rail member 14. Therefore, the sixth embodiment can provide the same effects as the above-mentioned embodiments can do.

While the vehicle passenger restraint device is mounted within the steering wheel or the instrument panel in the above-mentioned embodiments, it may be mounted within a door panel or side body panel of the vehicle.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A position sensor system provided at a slidable vehicle seat for sensing seat position in zones and facilitating controlling of the operation of a vehicle passenger restraint device according to a position of said vehicle seat relative to said vehicle passenger restraint device, said vehicle seat including a pair of substantially parallel slide rail means which comprise upper rail members and lower rail members mounted to a floor of a vehicle, said upper rail members being attached to lower portions of said vehicle seat and supported to said lower rail members so as to be movable along said lower rail members, so that said vehicle seat can be moved along said lower rail members; wherein said upper rail members and said lower rail members are combined with each other, to thereby define inner spaces and said position sensor system is mounted within at least one of said inner spaces;

said position sensor system comprising:
a magnet arranged within one of an upper rail member and lower rail member of one of the pair of the slide rail means and mounted to a predetermined portion of the one of said upper rail member and lower rail member; and a magnetic sensor arranged within the other of said upper rail member and lower rail member and mounted to a predetermined portion of the other of said upper rail member and lower rail member so as to be opposed to said magnet;

the other of said upper rail member and lower rail member having an opening formed in said predetermined portion thereof, said magnetic sensor being provided with an armor case having a flange portion, and said magnetic sensor being mounted to said predetermined portion of the other of said upper rail member and lower rail member with said armor case being fitted through said opening, and with said flange portion covering said opening.

2. A position sensor system as set forth in claim 1, wherein said magnet is mounted to said predetermined portion of the one of said upper rail member and lower rail member through an iron plate serving as a yoke.

3. A position sensor system as set forth in claim 1, wherein the one of said upper rail member and lower rail member has a frame portion provided at said predetermined portion thereof, and said magnet is received in and supported by said frame portion.

4. A position sensor system as set forth in claim 3, wherein said frame portion is formed by causing said predetermined portion of the one of said upper rail member and lower rail member to be protruded inwardly.

5. A position sensor system as set forth in claim 1, wherein the one of said upper rail member and lower rail member has a recess portion provided at said predetermined portion thereof, and said magnet is received in said recess portion.

6. A position sensor system as set forth in claim 1, wherein the one of said upper rail member and lower rail member has a pair of spaced apart rising pieces formed by causing regions of said predetermined portion thereof to be cut and causing said regions to rise up inwardly, and said magnet is interposed between said spaced apart rising pieces and retained by said spaced apart rising pieces.

7. A position sensor system as set forth in claim 1, wherein said armor case of said magnetic sensor further has a pair of spaced apart spring clips provided at both sides thereof, said magnetic sensor being mounted to said predetermined portion of the other of said upper rail member and lower rail member with said armor case being inserted through said opening, with said spring clips being engaged with an edge of said opening, and with said flange portion being pressed against the other of said upper rail member and lower rail member due to actions of said spring clips.

8. A position sensor system as set forth in claim 1, wherein said flange portion is provided with an applying piece protruding laterally from said flange portion, said magnetic sensor being mounted to said predetermined portion of the other of said upper rail member and lower rail member by causing said applying piece to be secured to said predetermined portion of the other of said upper rail member and lower rail member by means of a tapping screw.

9. A position sensor system as set forth in claim 1, wherein said position sensor system further includes cleaner means for cleaning said magnet, said cleaner means being arranged within the other of said upper rail member and lower rail member and mounted to a second predetermined portion of the other of said upper rail member and lower rail member.

10. A position sensor system as set forth in claim 9, wherein said cleaner means comprises a body mounted to said second predetermined portion of the other of said upper rail member and lower rail member, and cleaner piles provided on said body.

11. A position sensor system as set forth in claim 1, wherein said magnet comprises a strip-shaped magnet, said strip-shaped magnet having chamfered upper edge portions extending along a longitudinal direction thereof and sloping downward.

12. A position sensor system as set forth in claim 11, wherein the one of said upper rail member and lower rail member has a pair of spaced apart rising pieces formed by causing regions of said predetermined portion thereof to be cut and causing said regions to rise up inwardly, and said magnet is interposed between said spaced apart rising pieces and retained by said spaced apart rising pieces.

13. A position sensor system as set forth in claim 11, wherein the one of said upper rail member and low rail member has a recess portion provided at said predetermined portion thereof, and said magnet is received in said recess portion.

14. A position sensor system as set forth in claim 11, wherein the one of said upper rail member and lower rail member has a frame portion provided at said predetermined portion thereof, and said magnet is received in and supported by said frame portion.

15. A position sensor system as set forth in claim 14, wherein said frame portion is formed by causing said predetermined portion of the one of said upper rail member and lower rail member to be protruded inwardly.

16. A slidable vehicle seat comprising:

a pair of substantially parallel slide rail means including upper rail members and lower rail members mounted to a floor of a vehicle;

said upper rail members being attached to lower portions of said vehicle seat and supported to said lower rail members so as to be movable along said lower rail members, so that said vehicle seat can be moved along said lower rail members;

said upper rail members and said lower rail members being combined with each other, to thereby define inner spaces therein; and a position sensor system for sensing seat position in zones and facilitating controlling of the operation of a vehicle passenger restraint device according to a position of said vehicle seat relative to said vehicle passenger restraint device;

said position sensor system being mounted within at least one of said inner spaces;

said position sensor system comprising:

a magnet arranged within one of an upper rail member and lower rail member of one of the pair of said slide rail means and mounted to a predetermined portion of the one of said upper rail member and lower rail member; and a magnetic sensor arranged within the other of said upper rail member and lower rail member and mounted to a predetermined portion of the other of said upper rail member and lower rail member so as to be opposed to said magnet;

the other of said upper rail member and lower rail member having an opening formed in said predetermined portion thereof, said magnetic sensor being provided with an armor case having a flange portion, and said magnetic sensor being mounted to said predetermined portion of the other of said upper rail member and lower rail member with said armor case being fitted through said opening, and with said flange portion covering said opening.

17. A slidable vehicle seat as set forth in claim 16, wherein said magnet is mounted to said predetermined portion of the one of said upper rail member and lower rail member through an iron plate serving as a yoke.

18. A slidable vehicle seat as set forth in claim 16, wherein the one of said upper rail member and lower rail member has a recess portion provided at said predetermined portion thereof, and said magnet is received in said recess portion.

19. A slidable vehicle seat as set forth in claim 16, wherein the one of said upper rail member and lower rail member has a pair of spaced apart rising pieces formed by causing regions of said predetermined portion thereof to be cut and causing said regions to rise up inwardly, and said magnet is interposed between said spaced apart rising pieces and retained by said spaced apart rising pieces.

20. A slidable vehicle seat as set forth in claim 16, wherein said flange portion is provided with an applying pieces protruding laterally from said flange portion, said magnetic sensor being mounted to said predetermined portion of the other of said upper rail member and lower rail member by causing said applying piece to be secured to said predetermined portion of the other of said upper rail member and lower rail member by means of a tapping screw.

21. A slidable vehicle seat as set forth in claim 16, wherein said armor case of said magnetic sensor further has a pair of spaced apart spring clips provided at both sides thereof, said magnetic sensor being mounted to said predetermined portion of the other of said upper rail member and lower rail member with said armor case being inserted through said opening, with said spring clips being engaged with an edge of said opening, and with said flange portion being pressed against the other of said upper rail member and lower rail member due to actions of said spring clips.

22. A slidable vehicle seat as set forth in claim 16, wherein the one of said upper rail member and lower rail member has a frame portion provided at said predetermined portion thereof, and said magnet is received in and supported by said frame portion.

23. A slidable vehicle seat as set forth in claim 21, wherein said frame portion is formed by causing said predetermined portion of the one of said upper rail member and lower rail member to be protruded inwardly.

24. A slidable vehicle seat as set forth in claim 16, wherein said position sensor system further includes cleaner means for cleaning said magnet, said cleaner means being arranged within the other of said upper rail member and lower rail member and mounted to a second predetermined portion of the other of said upper rail member and lower rail member.

25. A slidable vehicle seat as set forth in claim 24, wherein said cleaner means comprises a body mounted to said second predetermined portion of said upper rail member and lower rail member, and cleaner piles provided on said body.

26. A slidable vehicle seat as set fourth in claim 16, wherein said magnet comprises a strip-shaped magnet, said strip-shaped magnet having chamfered upper edge portions extending along a longitudinal direction thereof and sloping downward.

27. A slidable vehicle seat as set forth in claim 26, wherein the one of said upper rail member and lower rail member has a recess portion provided at said predetermined portion thereof, and said magnet is received in said recess portion.

28. A slidable vehicle seat as set forth in claim 26, wherein the one of said upper rail member and lower rail member has a pair of spaced apart rising pieces formed by causing regions of said predetermined portion thereof to be cut and causing said regions to rise up inwardly, and said magnet is interposed between said spaced apart rising pieces and retained by said spaced apart rising pieces.

29. A slidable vehicle seat as set forth in claim 26, wherein the one of said upper rail member and lower rail member has a frame portion provided at said predetermined portion thereof, and said magnet is received in and supported by said frame portion.

30. A slidable vehicle seat as set forth in claim 29, wherein said frame portion is formed by causing said predetermined portion of the one of said upper rail member and lower rail member to be protruded inwardly.

* * * * *